US006839108B1

(12) United States Patent
Hirakata et al.

(10) Patent No.: US 6,839,108 B1
(45) Date of Patent: Jan. 4, 2005

(54) LIQUID CRYSTAL DISPLAY DEVICE AND METHOD OF MANUFACTURING THE SAME

(75) Inventors: Yoshiharu Hirakata, Kanagawa (JP); Rumo Satake, Kanagawa (JP); Hideaki Kuwabara, Kanagawa (JP); Takeshi Nishi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/311,070

(22) Filed: May 13, 1999

(30) Foreign Application Priority Data

May 16, 1998 (JP) .......................................... 10-152303
May 29, 1998 (JP) .......................................... 10-150083

(51) Int. Cl.⁷ ........................ G02F 1/1335; G02F 1/136
(52) U.S. Cl. ........................................ 349/114; 349/43
(58) Field of Search ........................ 349/141, 61, 147, 349/38–43, 114

(56) References Cited

U.S. PATENT DOCUMENTS

| | | | | |
|---|---|---|---|---|
| 4,185,894 A | * | 1/1980 | Hilton et al. ................. | 350/338 |
| 5,056,895 A | * | 10/1991 | Kahn ............................ | 359/87 |
| 5,168,383 A | * | 12/1992 | Iwaki et al. .................... | 359/71 |
| 5,461,501 A | * | 10/1995 | Sato et al. ..................... | 349/43 |
| 5,650,835 A | * | 7/1997 | Matic ........................... | 394/201 |
| 5,940,154 A | * | 8/1999 | Ukita et al. ................... | 349/113 |
| 5,963,283 A | * | 10/1999 | Omae et al. ................... | 349/86 |
| 6,049,364 A | * | 4/2000 | Takahara et al. .............. | 349/10 |
| 6,081,315 A | * | 6/2000 | Matsuyama et al. ......... | 349/143 |
| 6,084,647 A | * | 7/2000 | Hatano et al. ................. | 349/15 |
| 6,108,056 A | * | 8/2000 | Nakajima et al. ............. | 349/38 |
| 6,249,327 B1 | * | 6/2001 | Murade et al. ................ | 349/43 |

FOREIGN PATENT DOCUMENTS

| | | |
|---|---|---|
| JP | 4-338721 | 11/1992 |
| JP | 7-230101 | 8/1995 |
| JP | 7-306409 | 11/1995 |

OTHER PUBLICATIONS

Liquid Crystal Display element and projection display deivce using the same [JP 07–230101], (English translation).*

* cited by examiner

Primary Examiner—Dung T. Nguyen
(74) Attorney, Agent, or Firm—Eric J. Robinson; Robinson Intellectual Property Law Office, P.C.

(57) ABSTRACT

To provide a novel liquid crystal display device comprising a light reflection layer where light is likely to more effectively reflect, and a method of manufacturing the same. The present invention can realize high resolution and high opening rate by using a dielectric multi-layer film as the light reflection layer to form thereon a pixel electrode consisting of a transparent conductive films.

26 Claims, 22 Drawing Sheets

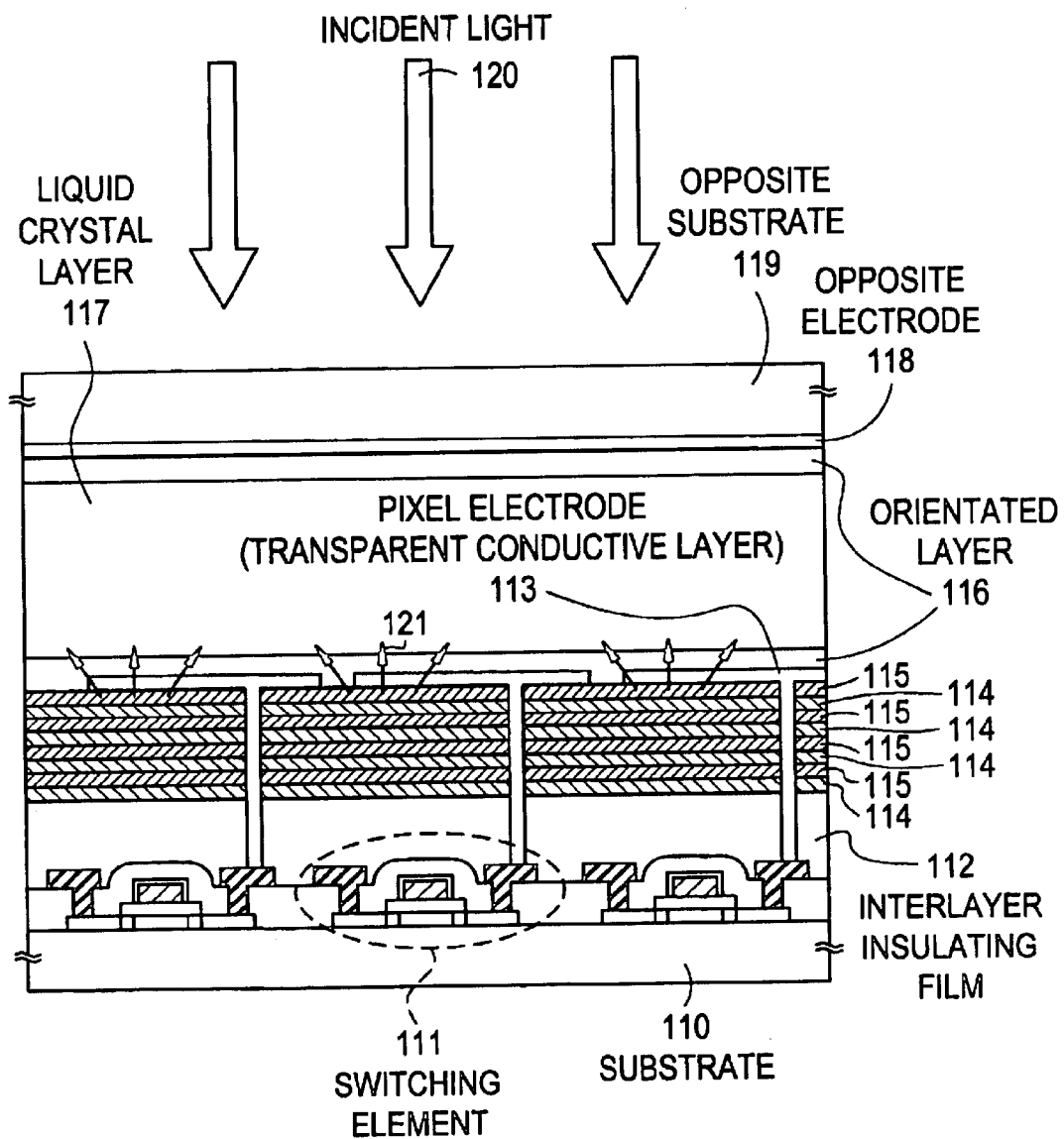

ADDITION OF P OR B ION

343
SWITCHING ELEMENT

STEP OF FORMING DIELECTRIC MULTI-LAYER FILM

STEP OF FORMING CONTACT HOLE

STEP OF FORMING PIXEL ELECTRODE

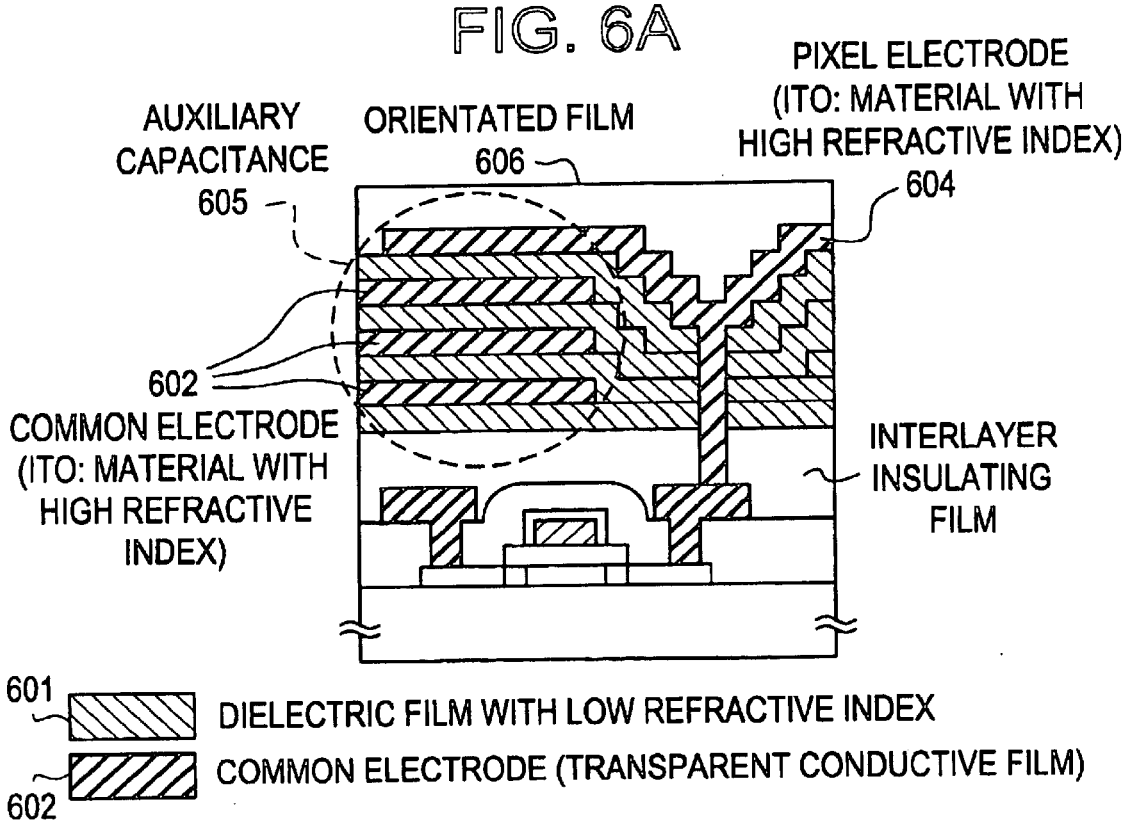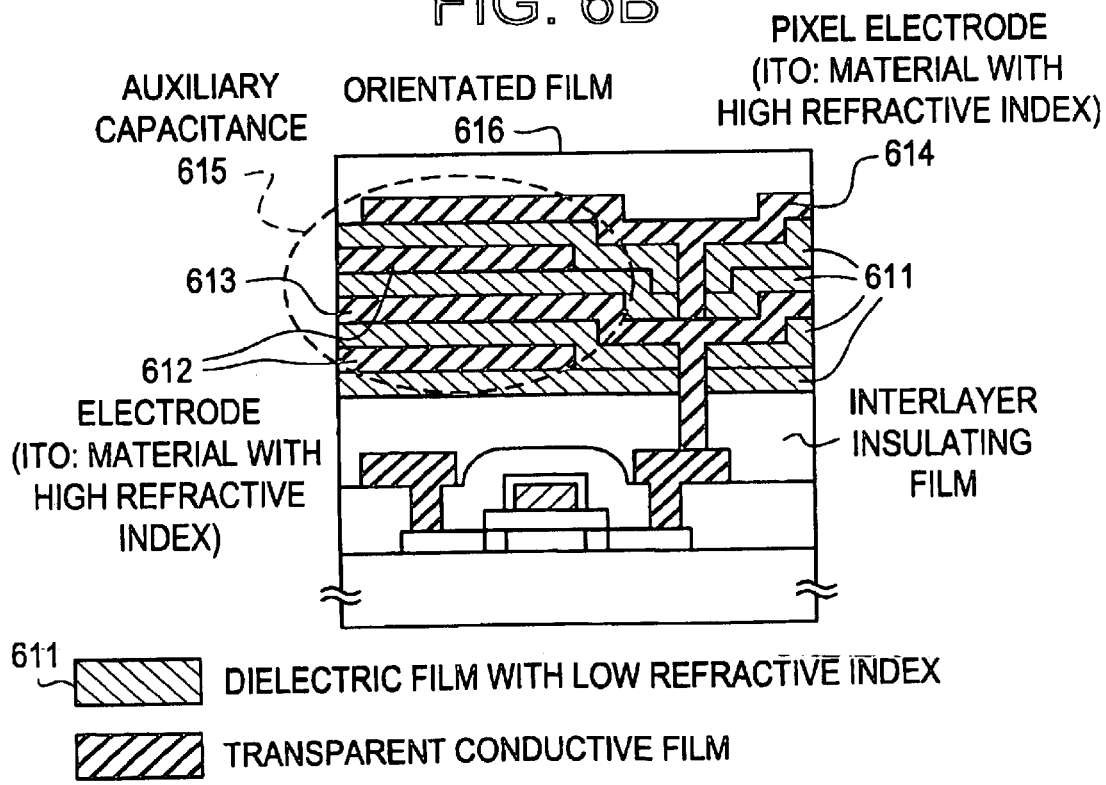

STEP OF FORMING REFLECTION LAYER AND DIELECTRIC FILM

STEP OF FORMING CONTACT HOLE

STEP OF FORMING PIXEL ELECTRODE

STEP OF FORMING CAPACITANCE ELECTRODE 1702 AND DIELECTRIC FILM 1703

STEP OF FORMING REFLECTION LAYER 1704 AND DIELECTRIC FILM 1705

STEP OF FORMING CONTACT HOLE

STEP OF FORMING PIXEL ELECTRODES 1706 ~ 1708

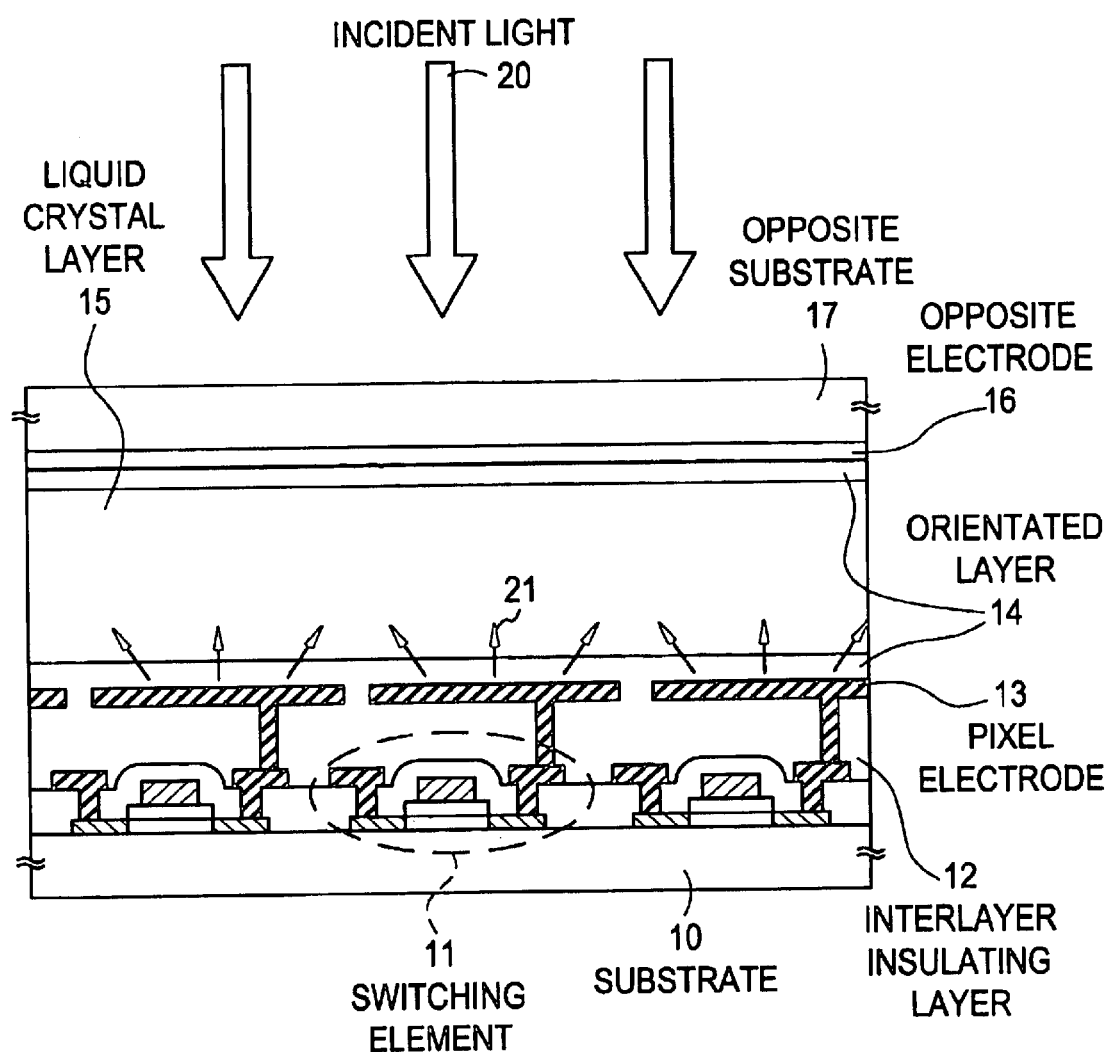

US 6,839,108 B1

LIQUID CRYSTAL DISPLAY DEVICE AND METHOD OF MANUFACTURING THE SAME

BACKGROUND OF THE INVENTION

1. Field of the Invention

The present invention relates to the structure of an electronic device such as personal computers and word processors, and more specifically, to a liquid crystal display (LCD) device equipped with the electronic device and a method of manufacturing a reflection layer in the liquid crystal display device. The present invention may also be applied to an electro-optical device having the liquid crystal display device.

A "semiconductor device" as used herein refers to a general device activated by a semiconductor. Therefore, the above-noted liquid crystal display device and the electro-optical device also fall within a category of semiconductor device. For clarification, the terms of "liquid crystal display device" and "electro-optical device" are separately used herein.

2. Description of the Related Arts

Typically, a reflection type liquid crystal display device is known. The reflection type liquid crystal display device is more advantageous than a transmission type liquid crystal display device in that a lower power consumption may be achieved since no back light is used. Incidentally, the reflection type liquid crystal display device has been increasingly required for a direct-vision type display for mobile computers and video cameras.

FIG. 20 is a schematic view showing an example of a conventional structure. Referring to FIG. 20, between a substrate 10 and an opposing substrate 17 are provided switching elements 11 such as thin film transistors, an interlayer insulating film 12, pixel electrodes 13, an orientated layer 14, a liquid crystal layer 15, the orientated layer 14, and an opposite electrode 16 in the stated order from the top surface of the substrate 10. Incident light 20 is reflected by the pixel electrodes 13 to generate a reflection light 21. It is to be noted that although all components are not shown in FIG. 20, which is a schematic view, a number of switching elements and a number of pixel electrodes are formed in a matrix on the surface of the substrate 10.

The reflection type liquid crystal display device utilizes an optical modulating action of the liquid crystal to select the state where the incident light is reflected by the pixel electrodes to be outputted to the outside of the device and the state where the incident light is not outputted to the outside of the device, thereby allowing for the light or dark indication, and a combination thereof would allow an image to be displayed. Each pixel electrode is made of a metal with high reflectivity such as aluminum, and is electrically connected to a switching element such as a thin film transistor.

FIG. 21 is a top view showing a conventional liquid crystal panel (corresponding to that shown in FIG. 20), and is a magnification showing a portion of a display region 22. In FIG. 21, the switching elements 11, the display region 22 consisting of the pixel electrodes 13, etc, a driver circuit 23 for driving in an X-direction, and a driver circuit 24 for driving in a Y-direction are provided on the substrate 10.

In such a conventional arrangement in which the pixel electrodes made of a metal material having a high reflectivity are used as a reflection layer, the light reflectivity is conventionally limited (e.g., less than 92% for an aluminum electrode).

Further, as shown in FIG. 21, there is a fear that light is leaked from a gap formed between the pixel electrodes 13 that are separately arranged from each other for every pixel. Therefore, a problem of a so-called light leak phenomenon occurred in which a reduced off resistance of the switching elements 11, occurrence of a photo carrier, and the like causes charges of the pixel electrodes to leak, thereby reducing a liquid crystal driving voltage.

Since the conventional reflection layer (pixel electrodes made of a metal material) does not provide a sufficient reflection and irregular reflection of light, there is a problem with a brightness suitable for a liquid crystal display device (in particular, a direct-vision-type reflection type liquid crystal panel). Also, in the conventional reflection layers (pixel electrodes), gaps between adjacent reflection layers (pixel electrodes) are large, thereby causing the light leak.

Further, conventionally, such a problem has been arisen in which the reflectivity of the refection layer is lowered due to formation of an orientated layer with a high refractive index on the reflection layer (electrodes made of a metal material). For example, in the case where an orientated layer (having the refractive index of 1.6) is formed on a deposited aluminum film (having the reflectivity of 91.6%), the reflectivity is lowered to 87.4% in calculation, or is lowered to approximately 85–86% according to an actual experiment. Alternatively, when silver is used as a metal material, a silver electrode having the reflectivity as high as 97.6% is liable to be oxidized. Thus, the silver is difficult to be employed because of being difficult to be processed.

SUMMARY OF THE INVENTION

The present invention has been made to solve the foregoing problems, and therefore has an object of the present invention to provide a novel liquid crystal display device comprising a reflection layer in which incident light is reflected more efficiently, and a method of manufacturing the same.

According to one aspect of the present invention, a liquid crystal display device is characterized by comprising:

a switching element formed on a substrate;

a pixel electrode formed of a transparent conductive film, the electrode being connected to the switching element; and a reflection layer formed of a dielectric multilayer film, which is arranged in contact with the pixel electrode.

According to another aspect of the present invention, a liquid crystal display device comprising a switching element formed on a substrate, a pixel electrode connected to the switching element, and a reflection layer, is characterized in that the pixel electrode is formed of a transparent conductive film, and is characterized in that the reflection layer formed of a dielectric multilayer film is provided under the pixel electrode.

According to a further aspect of the present invention, a liquid crystal display device comprising a switching element formed on a substrate, a pixel electrode connected to the switching element, and a reflection layer, is characterized in that the switching element being connected to a capacitance, the capacitance comprising a common electrode formed of a transparent conductive film, a dielectric film on the common electrode, and the pixel electrode formed of a transparent conductive film on the dielectric film, and is characterized in that the reflection layer formed of a dielectric multilayer film is provided below the common electrode.

In the above-mentioned structures, it is characterized in that the dielectric film is made of a dielectric material having a low refractive index, and the common electrode and the pixel electrode are both made of a conductive material having a high refractive index.

Further, in the above-mentioned respective structures, it is characterized in that a liquid crystal is sealed between a pair of substrates, and the liquid crystal display device comprises the pixel electrode arranged in a matrix on one substrate, a thin film transistor connected to the pixel electrode, and a reflection layer.

According to a still further aspect of the present invention, a method of manufacturing a liquid crystal display device is characterized by comprising the steps of:

forming a switching element on a substrate;

forming a reflection layer formed of a dielectric multilayer film above the switching element; and forming a pixel electrode formed of a transparent conductive film on the reflection layer.

According to a still further aspect of the present invention, a method of manufacturing a liquid crystal display device is characterized by comprising the steps of:

forming a switching element on a substrate;

forming an interlayer insulating film over the switching element;

forming a common electrode formed of a transparent conductive film on the interlayer insulating film;

forming a reflection layer formed of a dielectric multilayer film on the common electrode; and forming a pixel electrode formed of a transparent conductive film on the reflection layer to form an auxiliary capacitance comprised of the pixel electrode, the dielectric multilayer film, and the common electrode.

In the above-mentioned respective structures according to the manufacturing method of the present invention, it is characterized in that the step of forming the dielectric multilayer film is performed by a sputtering method or a vacuum deposit method.

According to a still further aspect of the present invention, it is characterized in that a liquid crystal is sealed between a pair of substrates, and a liquid crystal display device comprises:

a first transparent electrode formed on one substrate;

a second transparent electrode provided on the other substrate; and a reflection layer formed of a dielectric multilayer film.

In the above-mentioned structure, the liquid crystal display device comprising the first and second transparent electrode being arranged in a stripe manner, and a reflection layer formed of a dielectric multilayer film below the second transparent electrode is characterized in that the liquid crystal display device has a simple matrix type driving system.

According to a still further aspect of the present invention, a liquid crystal display device is characterized by comprising:

a switching element formed on a substrate;

a pixel electrode formed of a transparent conductive film, the electrode being connected to the switching element;

a dielectric film below the pixel electrode; and a reflection layer made of a metal material below the dielectric film.

In the above-mentioned structure, it is characterized in that the pixel electrode is made of a conductive material having a high refractive index, and the dielectric film is made of a dielectric material having a low refractive index.

In the above-mentioned structure, it is characterized in that the pixel electrode, the dielectric film, and the reflection layer constitute a capacitance.

According to a still further aspect of the present invention, a liquid crystal display device is characterized by comprising:

a switching element formed on a substrate;

a pixel electrode formed of a transparent conductive film, the electrode being connected to the switching element;

a dielectric multilayer film below the pixel electrode; and a reflection layer made of a metal material below the dielectric multilayer film.

In the above-mentioned respective structures, it is characterized in that the pixel electrode, the dielectric multilayer film, and the reflection layer constitute a capacitance.

In the above-mentioned respective structures, it is characterized in that a potential of the reflection layer is a common potential.

In the above-mentioned respective structures, it is characterized in that a reflecting area of the reflection layer is greater than an electrode area of the pixel electrode.

In the above-mentioned respective structures, it is characterized in that a liquid crystal is sealed between a pair of substrates, and the liquid crystal display device comprises the pixel electrode arranged in a matrix manner on one substrate, a thin film transistor connected to the pixel electrode, and a reflection layer.

According to a still further aspect of the present invention, a method of manufacturing a liquid crystal display device is characterized by comprising the steps of:

forming a switching element on a substrate;

forming a reflection layer formed of a metal material above the switching element;

forming a dielectric film on the reflection layer; and forming a pixel electrode formed of a transparent conductive film on the dielectric film.

According to a still further aspect of the present invention, a method of manufacturing a liquid crystal display device is characterized by comprising the steps of:

forming a switching element on a substrate;

forming a reflection layer formed of a metal material above the switching element;

forming a dielectric multilayer film; and forming a pixel electrode formed of a transparent conductive film on the dielectric multilayer film.

According to a still further aspect of the present invention, a method of manufacturing a liquid crystal display device is characterized by comprising the steps of:

forming a switching element on a substrate;

forming an interlayer insulating film over the switching ok element;

forming a reflection layer made of a metal material on the interlayer insulating film;

forming a dielectric film on the reflection layer; and forming a pixel electrode formed of a transparent conductive film on the dielectric film to form an auxiliary capacitance comprised of the pixel electrode, the dielectric film, and the reflection layer.

BRIEF DESCRIPTION OF THE DRAWINGS

In the accompanying drawings:

FIG. 1 is a sectional view showing an example of a structure according to Embodiment 1 of the present invention;

FIGS. 6A and 6B are sectional views showing examples of structures according to Embodiment 5 of the present invention;

FIG. 20 is a sectional view shown an example of a conventional structure;

DETAILED DESCRIPTION OF PREFERRED EMBODIMENTS

Figure 2A:
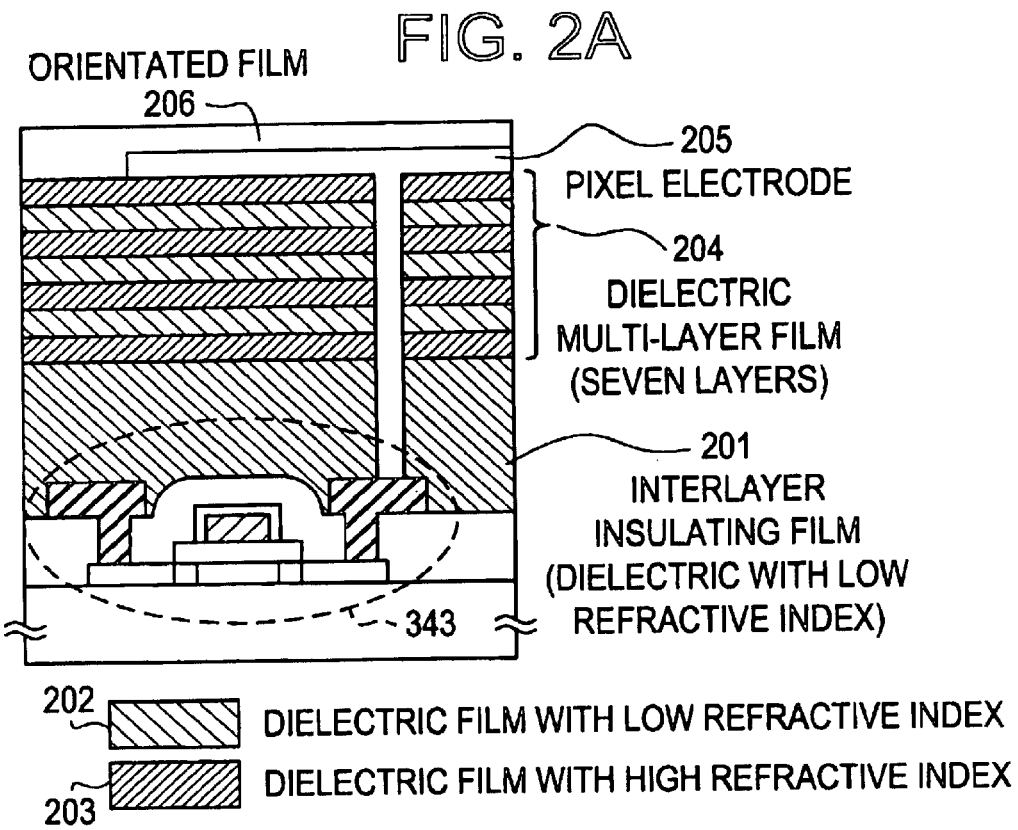
FIGS. 2A and 2B are sectional views showing examples of structures according to Embodiments 2 and 3 of the present invention.

FIG. 1 is a simplified sectional view showing an example of the structure of the present invention.

A liquid crystal display panel of the present invention comprises switching elements 111, an interlayer insulating film 112, dielectric multi-layer films 114 and 115, pixel electrodes 113, an orientated layer 116, a liquid crystal layer 11?, another orientated layer 116 and an opposite electrode 118 formed on a substrate 110 and under an opposite substrate 119 in the stated order.

A first feature of the present invention resides in that a reflection layer that reflects incident light is constructed of dielectric multi-layer films. The dielectric multi-layer films are constructed of several to several tens layers of dielectric films with a low refractive index and dielectric films with a high refractive index which are alternately laminated. The dielectric multi-layer films used as the reflection layers of the present invention also function as the protective films for preventing deterioration by light. In addition, the reflection layers, i.e., dielectric multi-layer films, of the present invention have insulating property to also function as the interlayer insulating films.

As to materials for the above-mentioned reflection films, $SiO_2$, $MgF_2$, $Na_3AlF_6$, etc. may be used for the dielectric films 114 with a low refractive index. Possible materials used for the dielectric films 114 with a low refractive index, other than those, include an orientated layer, acrylic resin, polyimide (with refractive index of 1.5 to 1.6) and BCB (benzocyclobutene), etc. As the dielectric films 115 with a high refractive index, $TiO_2$, $ZrO_2$, $Ta_2O_5$, ZnS, ZnSe, ZnTe, Si, Ge, $Y_2O_3$, $Al_2O_3$ and the like may bemused. Materials with a high refractive index, which may be used other than those, include a transparent conductive film such as ITO (with refractive index of 1.98).

In the present invention, however, the film thickness of the dielectric multi-layer films needs to be adjusted when used as the reflection layer so that the dielectric multi-layer film becomes $\lambda/4$ film at the center wavelength of a required reflection wavelength range. The $\lambda/4$ film in this specification refers to a film that satisfies a relation of $nd=\lambda/4$, where n is a refractive index, d is a film thickness, and $\lambda$ is a center wavelength.

For instance, when a dielectric film with a low refractive index ($SiO_2$: refractive index of 1.43) is used as the reflection film of the present invention, the film thickness with which the dielectric multi-layer film becomes the A/4 film in the visible light region (400 nm<$\lambda$<700 nm) is within a range of 70 nm to 122 nm.

Further, when a dielectric film with a high refractive index ($TiO_2$: refractive index of 2.2) is used as the reflection film of the present invention, the film thickness with which the dielectric w multi-layer film becomes the $\lambda/4$ film in the visible light region (400 nm <$\lambda$<700 nm) is within a range of 45.5 nm to 79.5 nm.

In such dielectric multi-layer films in which the film thicknesses of the dielectric film with a low refractive index and dielectric film with a high refractive index are adjusted and the dielectric film with a low refractive index and the dielectric film with a high refractive index are alternately laminated, reflected light are enhanced with one another by an interference effect to efficiently improve the reflectivity, thereby being capable of obtaining a wavelength region of high reflectivity.

In regard to the number of layers of the dielectric multi-layer film, when each dielectric multi-layer film is made as the $\lambda/4$ film, the relation between the number of layers of the dielectric multi-layer films and the maximum reflectivity is shown in Table 1. Two layers consisting of a dielectric film with a low refractive index as the lower layer and a dielectric film with a high refractive index as the upper layer are called a set of layers.

TABLE 1

Maximum reflectivity (calculated value) when the lower layer is interlayer insulating film

| Dielectric multi-layer film (1 set = 2 layers) | Without orientated layer (%) | With orientated layer (%) |
| --- | --- | --- |
| 1 set (2 layers) | 32.3 | 15.1 |
| 2 sets (4 layers) | 61.4 | 45.6 |
| 3 sets (6 layers) | 80.8 | 71.0 |
| 4 sets (8 layers) | 91.0 | 86.0 |
| 5 sets (10 layers) | 95.9 | 93.6 |
| 6 sets (12 layers) | 98.2 | 97.1 |

Orientated layer refractive index of 1.6
Dielectric multi-layer film:
(lower layer) dielectric film with a low refractive index
titanium oxide: refractive index of 2.2
(upper layer) dielectric film with a high refractive index
silicon oxide: refractive index of 1.46

It says in Table 1 that the reflectivity becomes higher as the number of layers of the dielectric multi-layer film is increased. Therefore, when priority is given to high reflectivity, the dielectric multi-layer films are preferably laminated with three sets of layers (6 layers), more preferably four sets of layers (8 layers).

On the other hand, if manufacturing cost and yield take precedence, the number of layers is preferably as small as possible. The total film thickness of the dielectric multi-layer films is also desirably thin, in terms of processing, for forming contact holes after the film formation of the dielectric multi-layer films.

When a material of dielectric film with a low refractive index is used for the interlayer insulating film 112, an experimental result has been obtained in which the reflectivity hardly changes irrespective of presence or absence of the dielectric film 114 with a low refractive index formed in contact with the interlayer insulating film 112. As shown in an example of FIG. 2A, it is consequently preferable that a dielectric film with a low refractive index (such as $SiO_2$, acrylic resin and polyimide) is used to form an interlayer insulating film 201 covering the switching elements so that one layer of dielectric films 202 with a low refractive index is omitted to reduce the number of layers.

The present invention is not limited to the structure of FIG. 1 as long as it takes a structure in which the dielectric multi-layer film is used to form the reflection layer. For example, such an arrangement may be employed that the pixel electrode is provided using a material that has transparency and conductivity and the dielectric multi-layer film is formed thereon. In this case, the film thickness of the dielectric multi-layer film must be considered. It is because voltage loss may take place to affect the threshold characteristic and quickness to response of the liquid crystal, depending on the thickness of the dielectric multi-layer film (total film thickness of 2 $\mu$m or more). Therefore, as shown in FIG. 1, a preferable structure is such that the reflection layer for reflecting incident light is comprised of the dielectric multi-layer film, and the pixel electrodes are provided thereon using a material that has transparency and conductivity. In that case where the pixel electrodes are provided on the dielectric multi-layer film, layers laminated as many as, for example, twelve layers do not affect at all the threshold characteristic and quickness to response of the liquid crystal.

The above pixel electrodes 113 are arranged in matrix through the interlayer insulating film 112 and the dielectric multi-layer films, and are connected to the switching elements 111 such as thin film transistors. The pixel electrode is made up of a material having sufficient transparency and conductivity such as ITO (indium tin oxide) and $SnO_2$ (stannic oxide). Thus, when a pixel electrode 215 (ITO: refractive index of 1.98) consists a part of the reflection layer for reflecting the incident light as shown in FIG. 2B, the number of layers can preferably be reduced. In this case, the film thickness of the pixel electrode 215 is also adjusted within a range of 50.5 nm to 88.4 nm so that the electrode becomes the $\lambda/4$ film.

It has conventionally been required that a light shielding film such as a black mask is formed in a gap defined between the pixel electrodes, to thereby prevent deterioration of the switching elements by light. However, according to the present invention, the dielectric multi-layer films formed below the gap defined between the pixel electrodes have a function of positively shielding light obliquely permeated.

FIG. 1 shows an example in which the dielectric multi-layer film consists of four sets of layers, i.e, eight layers in total. With the structure of FIG. 1, the same degree of refractive index has been obtained as obtained with a conventional reflection electrode made of a metal material. Accordingly, if the materials, film thickness, the number of layers of the dielectric multi-layer films, or the like is appropriately changed, for instance, if the number of layers is changed to form the dielectric multi-layer films having five sets of layers (10 layers) or more, the reflection loss is small and the reflectivity higher than 90% may readily be obtained, even if the orientated layers are laminated.

According to the present invention, provision of the reflection layer consisting of the above-mentioned dielectric multi-layer films allows to improve the efficiency in utilizing light in comparison with the conventional structure (in which the pixel electrodes made of a metal material serves as the reflection layers), and to suppress the lowering of reflectivity due to the orientated layer, which has been a problem in prior arts. With employment of the present invention, reflectivity of 90% or more can be obtained.

Figure 9:
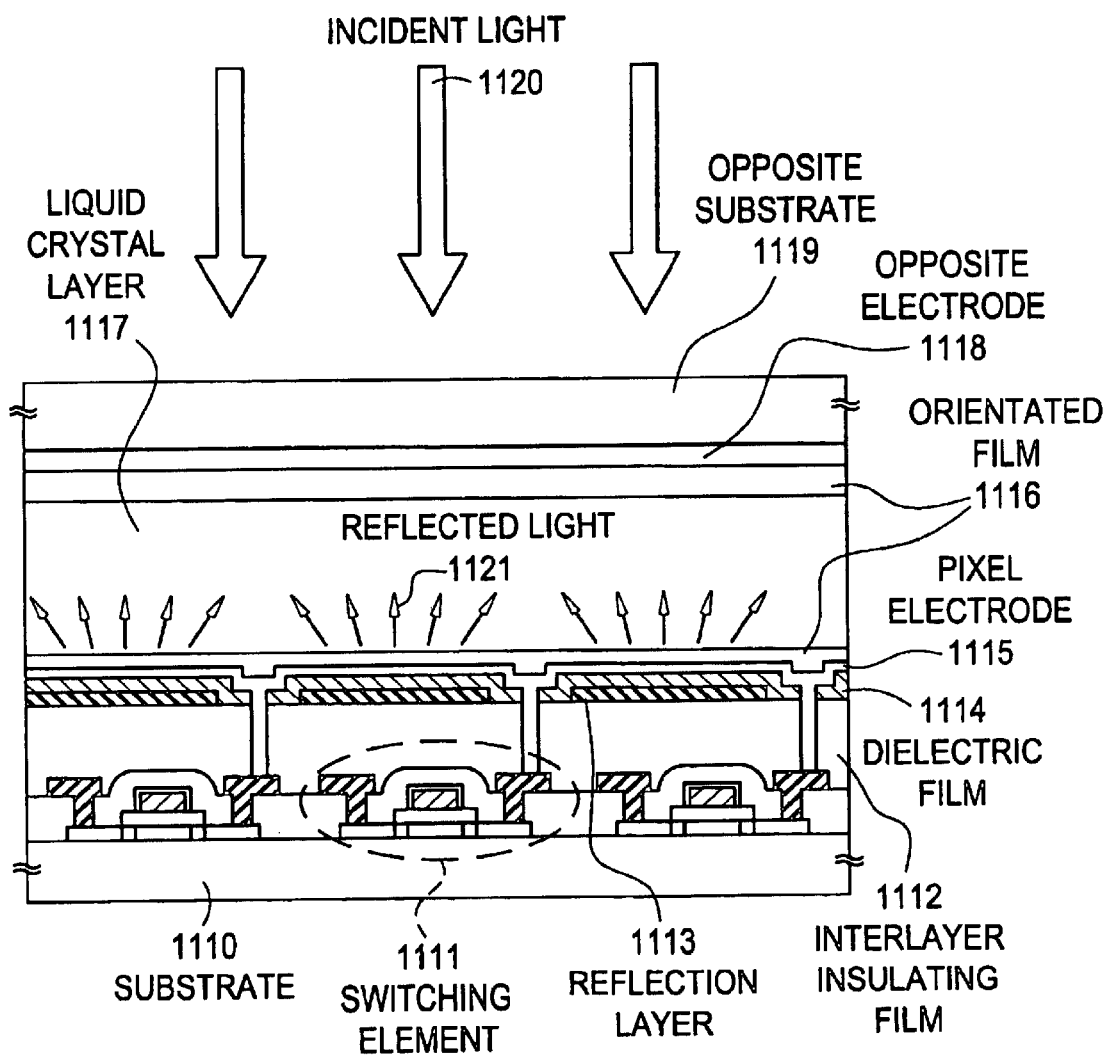
FIG. 9 is a sectional view showing an example of the structure of the present invention.

Another example of the structure of the present invention is shown in FIG. 9.

In FIG. 9, between a substrate 1110 and an opposite substrate 1119, switching elements 1111, an interlayer insulating film 1112, reflection layers 1113, a dielectric multi-layer film 1114, pixel electrodes 1115, an orientated layer 1116, a liquid crystal layer 1117, another orientated layer 1116, and an opposite electrode 1118 are formed in stated order.

In the conventional structure as shown in FIG. 20, pixel electrodes 13 have both functions of reflecting incident light and of applying electric field to a liquid crystal. Also in the conventional structure, it is necessary to prevent deterioration by light of the switching element by adding a step of forming a light shielding film such as a black mask or a reflection layer in the gap defined between the pixel electrodes.

By contrast to such conventional structures, the present invention does not employ the pixel electrode as the reflection layer, unlike the conventional case, and the pixel electrodes 1115 having a function of applying electric field to the liquid crystal is composed of a transparent conductive film.

As to materials of the above-mentioned pixel electrodes 1115, materials having sufficient transparency and conductivity, for example, ITO (indium tin oxide) and $SnO_2$ (tin oxide) may be used for the pixel electrodes 1115.

In addition, the reflection layer 1113 having a function of reflecting incident light is not electrically connected to the above pixel electrodes 1115.

Materials for the reflection layer 1113 of the present invention is not particularly limited so long as a metal material having reflectivity. For example, white metal materials with high reflectivity, such as aluminum, silver, rhodium, nickel, and an alloy containing those as the main component, may be used. Also, the reflection layer having a film thickness of 5 nm or more is enough to sufficiently function as the reflection layer. It should be noted that, in the present invention, since the dielectric multi-layer films and the pixel electrodes are formed on the reflection layer, the reflection layer preferably has a thickness of 500 nm or less when taking the flatness into consideration.

When a white metal material having a high reflectivity is used as the material for the reflection layer 1113, an oxide film (alumina, for example) or the like may be formed on the surface of this reflection layer through anodic oxidation method, high-pressure oxidation method or thermal oxidation method.

The first feature of the structure according to the present invention described above resides in that the reflection layer 1113 for reflecting incident light 1120 is not electrically connected to the switching elements 1111 and the pixel electrodes 1115.

Figure 21A:
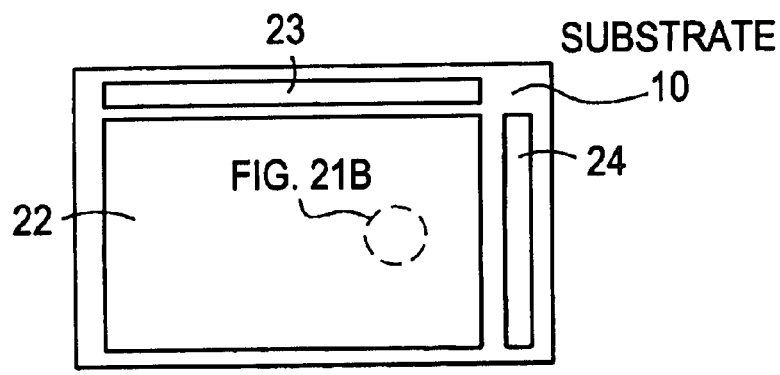
FIG. 21 is a top view showing an example of the conventional structure.
Figure 21B:
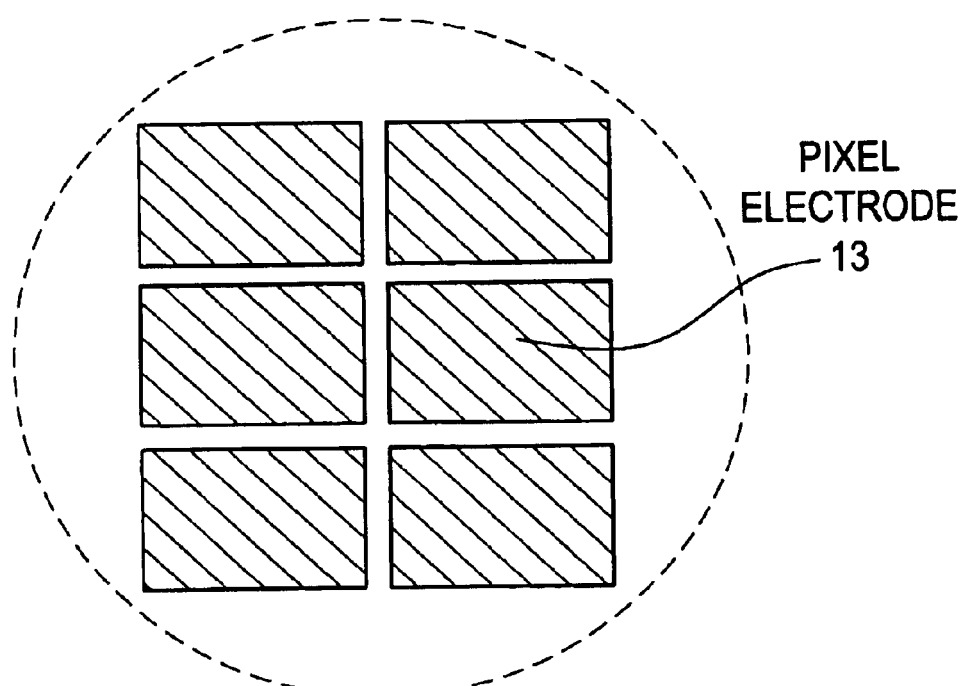

Therefore, the pattern of the reflection layer 1113 according to the present invention is not necessarily the conventional matrix-like pattern involving gaps as shown in FIG. 21. The occurrence of light leak may be therefore decreased and a large reflection area may also be obtained.

Figure 10A:
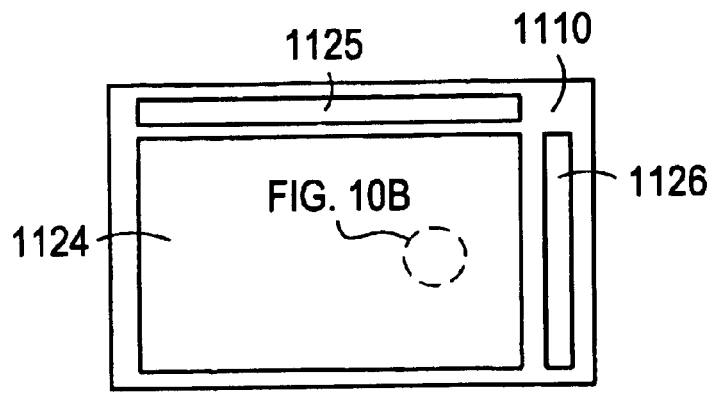
FIG. 10 is a top view showing an example of the structure of the present invention.
Figure 10B:
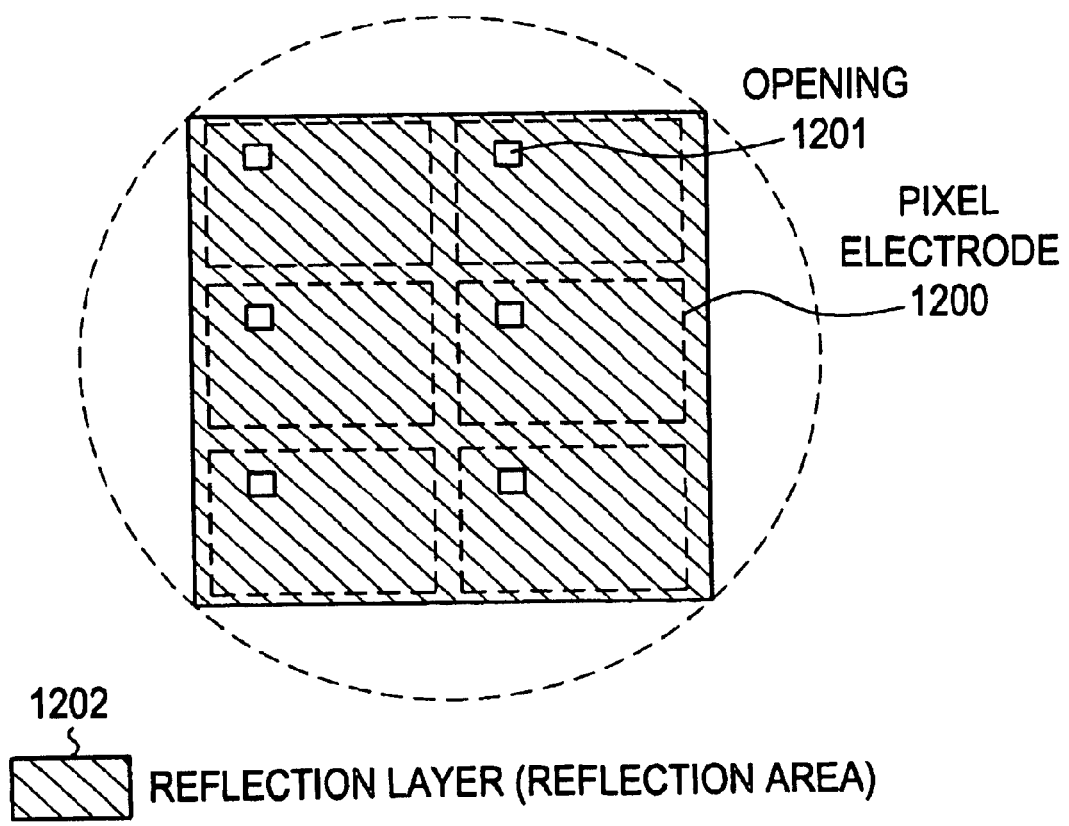

However, as shown in FIG. 10, on each contact region where a pixel electrode 1200 and a switching element (not shown) are brought into contact, in accordance with dimensions of a contact hole, an opening 1201 having dimensions to the extent which does not cause a short circuit with the pixel electrode is formed. This opening is sufficiently smaller as compared with the conventional gap.

Figure 14:
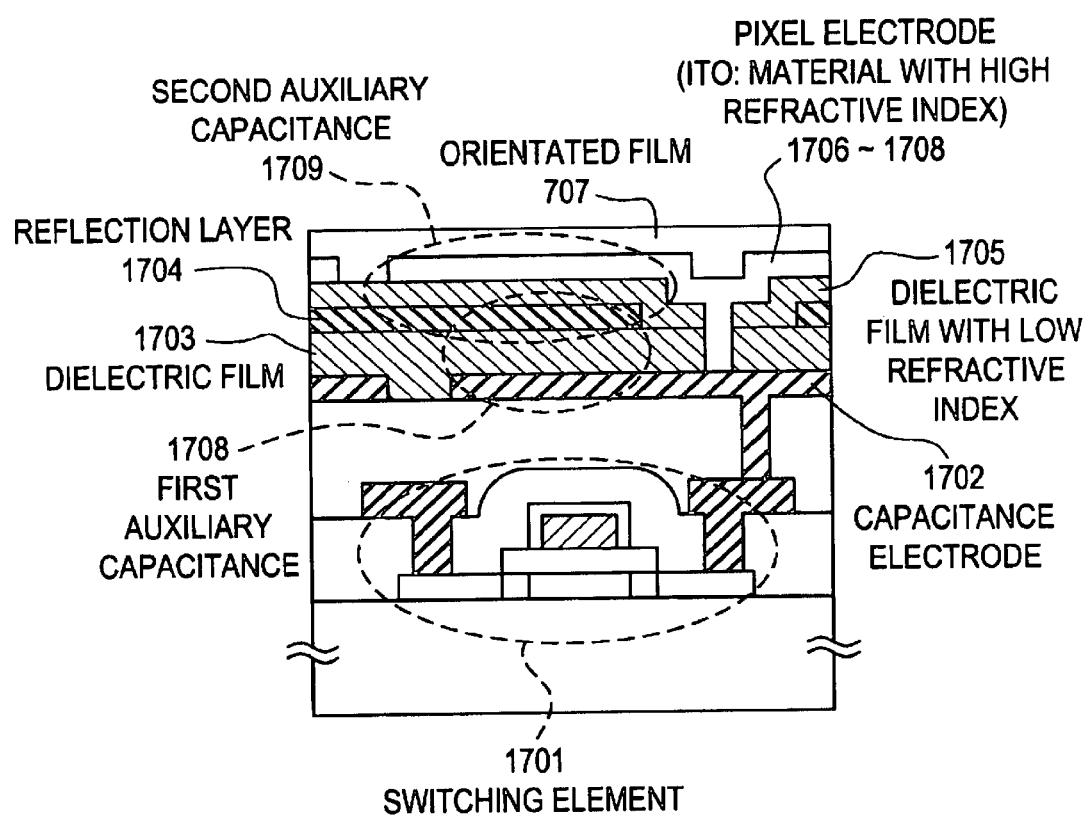
FIG. 14 is a sectional view showing an example of a structure according to Embodiment 10 of the present invention.

If the prevention of the light leak takes precedence, as shown in FIG. 14, a suitable structure is such that a capacitance electrode 1702 is formed below the opening. Using this capacitance electrode 1702 together with a reflection layer 1704 and a dielectric film 1703, a first auxiliary capacitance 1708 may be formed. The capacitance electrode 1702 is formed of a conductive material having reflectivity and light-shielding property, and can fully function to shield the switching element against light. Consequently, although the number of steps is increased as compared with the structure of FIG. 9, the occurrence of the light leak can be suppressed almost completely. Also, the capacitance electrode has a function of shielding electric field.

Figure 12:
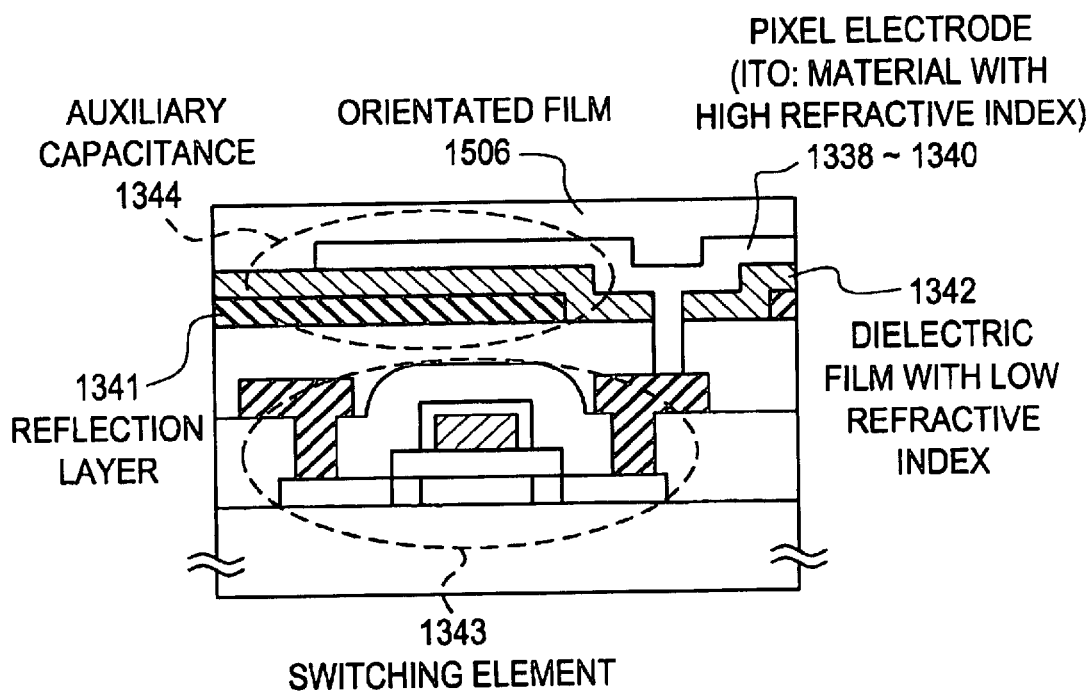
FIG. 12 is an enlarged sectional view showing an example of the structure of the present invention.

The first feature also includes that a capacitance is formed with the reflection layer 1113, the pixel electrode 1115 and the dielectric film 1114. In the structure of the present invention, the reflection layer and the pixel electrode are insulated with the dielectric film (also called as an insulating film). As shown in an example in FIG. 12 (an enlarged view showing a part of FIG. 9), an auxiliary capacitance 1344 may be formed with a reflection layer 1341, pixel electrodes 1338 to 1340 and a dielectric film 1342. In order to obtain a large capacitance by increasing the difference between electric potential of the pixel electrode and electric potential of the reflection layer, the reflection layer is preferably connected to a common wiring line to have the common electric potential (intermediate electric potential of a video signal to be transmitted as data). The reflection layer may be in floating state (electrically-isolated state).

The point that a material having a low refractive index is used as the dielectric film on the reflection layer and a material having a high refractive index is used as the pixel electrode to improve the reflectivity is also one of features of the present invention. To improve the reflectivity, however, the film thickness of the dielectric film and the pixel electrode need to be adjusted so that $\lambda/4$ film is obtained at the center wavelength of a required reflection wavelength range. As will be described below, when the film thickness of the dielectric film with a low refractive index and the pixel electrode (formed of a material having a high refractive index) is adjusted and laminated, rays of reflected light enhance with one another by an interference effect to effectively improve the reflectivity.

For instance, when a material having a high refractive index (ITO: refractive index of 1.98) is used as the above pixel electrode 1115, the film thickness with which the dielectric multi-layer film becomes the $\lambda/4$ film in the visible light region (400 nm<$\lambda$<700 nm) is within a range of 50.5 nm to 88.4 nm.

FIGS. 9 and 14 show an example where the dielectric film is consisted of a single layer. In the structures of FIGS. 9 and 14, the dielectric film with a low refractive index and the pixel electrode with a high refractive index which are adjusted in film thickness, respectively, are formed on the reflection layer so that rays of reflected light enhance with one another by an interference effect to obtain the reflectivity higher than that of the conventional reflection electrode formed of a metal material. Even with employment of the structure in which orientated layers are laminated, reflection loss is reduced and reflectivity of 90% or more can be readily obtained. It is to be noted that the above dielectric film also functions as a protective film of the reflection layer. In addition, since the above dielectric film has an insulating property, it also functions as an interlayer insulating film.

Figure 13:
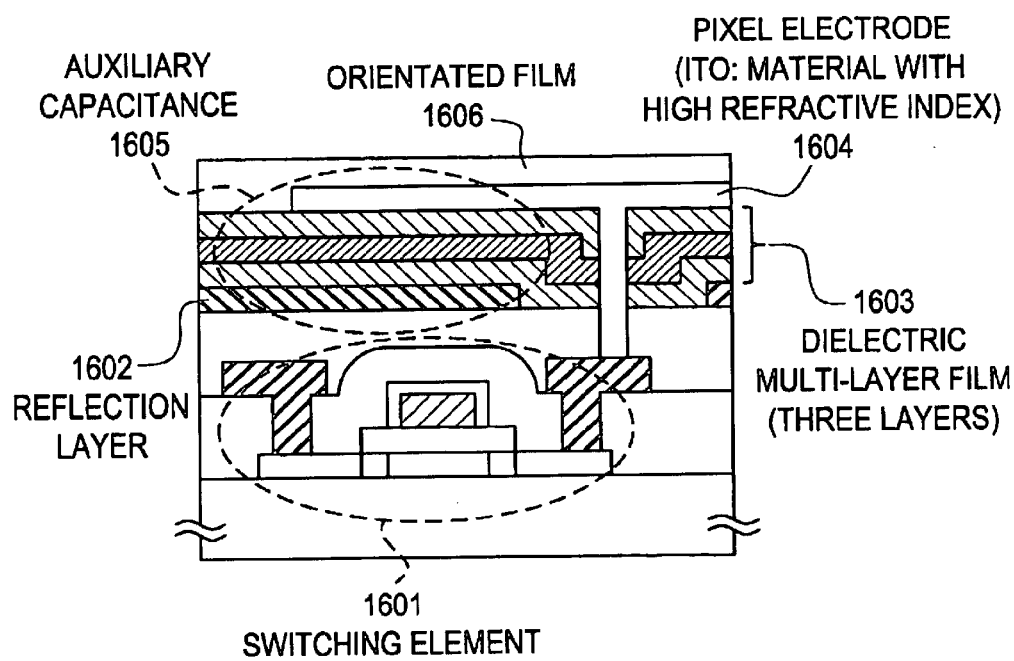
FIG. 13 is a sectional view showing an example of a structure according to Embodiment 9 of the present invention.

When priority is given to reflectivity, as shown in an example (where dielectric film comprises three layers laminated) shown in FIG. 13, it is preferable to laminate a dielectric multi-layer film 1603 on the above reflection layer.

This dielectric multi-layer film 1603 consists of several to several tens layers of a dielectric film with a low refractive index and a dielectric film with a high refractive index which are alternately laminated. The dielectric multi-layer film also has a function as a protective film of the reflection layer. In addition, since the dielectric multi-layer film has an insulating property, it also functions as an interlayer insulating film.

In the present invention, however, to improve the reflectivity in the dielectric multi-layer film, the film thickness of each dielectric multi-layer film needs to be adjusted so that the dielectric multi-layer film becomes the $\lambda/4$ film at the center wavelength of a required reflection wavelength range.

In the dielectric multi-layer in which the film thickness of the dielectric film with a low refractive index and the dielectric film with a high refractive index are adjusted and are alternately laminated, rays of reflected light enhance with one another by an interference effect to effectively improve the reflectivity, thereby being capable of obtaining a wavelength region of high reflectivity.

Accordingly, with employment of the above arrangement of the present invention, that is, when the dielectric multi-layer film is on the reflection layer or when the dielectric film with a low refractive index and the pixel electrode (a conductive film with a high refractive index) which are adjusted in its film thickness are laminated on the reflection layer, lowering of the reflectivity that has been a problem inherent in prior art can be suppressed.

Further, in regard to the number of layers of the dielectric multi-layer film formed on a metal film (evaporated aluminum film), the relationship, when each dielectric multi-layer film is the λ/4 film, between the number of layers of the dielectric multi-layer film and the maximum reflectivity is shown in Table 2.

TABLE 2

Maximum Reflectivity (calculated value) When Lower Layer is Evaporated Al

| Dielectric multi-layer film (1 set = 2 layers) | Without orientated layer (%) | With orientated layer (%) |
| --- | --- | --- |
| 1 set (2 layers) | 96.1 | 94.0 |
| 2 sets (4 layers) | 98.3 | 97.3 |
| 3 sets (6 layers) | 99.2 | 98.8 |
| 4 sets (8 layers) | 99.7 | 99.5 |

Orientated layer . . . refractive index of 1.6
Dielectric multi-layer film
   (lower layer) dielectric film with a low refractive index . . . titanium oxide: refractive index of 2.2
   (upper layer) dielectric film with a high refractive silicon oxide: refractive index of 1.46
*Evaporated Al . . . refractive index of 0.82, absorptivity of 5.99

In Table 2, as well as in Table 1, two layers consisting of a dielectric film with a low refractive index as the lower layer and a dielectric film with a high refractive index as the upper layer are called a set of layers.

It says in Table 2 that the reflectivity becomes higher as the number of layers of the dielectric multi-layer film is increased. Accordingly, when priority is given to high reflectivity, the dielectric multi-layer film is laminated with two sets of layers (4 layers), preferably three sets of layers (6 layers).

On the other hand, if the dielectric multi-layer film is used as a dielectric of capacitance, the number of layers is preferably three to five to thin the total film thickness. Also, the total film thickness of the dielectric multi-layer film is desirably thin, in terms of processing, for forming contact holes for connecting the pixel electrode and the switching element after the film formation of the dielectric multi-layer film. Thus, if manufacturing cost and yield take precedence, the number of layers is preferably as small as possible.

For instance, as shown in FIGS. 6A and 6B, in order to thin the total film thickness of the dielectric multi-layer film, it is preferred that the pixel electrode (ITO: refractive index of 1.98) with a film thickness of a range from 50.5 nm to 88.4 nm with which the λ/4 film is obtained is formed on the uppermost layer of the dielectric multi-layer film with a low refractive index, to thereby reduce the number of layers. When a capacitance is formed, reduced number of layers results in thin total film thickness, thereby being capable of obtaining a large capacitance.

It should be noted that because a pixel electrode 1604 is formed on the dielectric multi-layer film 1603, layers laminated as many as, for example, eight layers do not affect at all the threshold characteristic and quickness to response of the liquid crystal.

In the present invention, it is easy to arrange such that the film thickness and materials of the respective dielectric films are appropriately changed to selectively set the reflection wavelength.

Though several methods including coating method, sputtering method and vacuum evaporation method are enumerated as forming method of the above-mentioned dielectric multi-layer film, the present invention is not particularly limited to those. However, care is needed if vacuum drawing is performed while an organic resin film is exposed, since it is degasified. Incidentally, in the present invention, it is desirable that the dielectric multi-layer film is formed with a uniform film thickness.

Embodiment 1

In the present embodiment, a process example for forming a pixel matrix circuit of a reflection type LCD using the present invention is described with reference to FIGS. 3A to 3D and 4A to 4C. Incidentally, since the present invention is a technique relating to a reflection layer, the structure of a switching element, for example, the structure of a TFT itself is not limited to the present embodiment.

Initially, a substrate 301 having an insulating surface is prepared. For a substrate, a glass substrate, a quartz substrate, a ceramics substrate, a semiconductor substrate may be used. Next, an underlying film (not shown) is formed on the substrate. For the underlying film, a silicon oxide film, a silicon nitride film, a silicon nitride oxide film may be used in a film thickness of a rang from 100 nm to 300 nm. In the present embodiment, a TEOS is used for a raw material, and a silicon oxide film is formed in a film thickness of 200 nm. It is to be noted that if it is sufficiently flat like a quartz substrate, the underlying film may not be particularly formed.

Next, an active layer is formed on the substrate or the underlying film. The active layer may be formed of a crystalline semiconductor film (representatively, a crystalline silicon film) having a film thickness of a range from 20 nm to 100 nm (preferably, 25 nm to 70 nm). For forming the crystalline silicon film, any of well-known methods, for example, a laser crystallization, a thermal crystallization or the like may be used. However, in the present embodiment, a catalytic element (nickel) is added to promote the crystallization at a time of crystallization. This technique is disclosed in detail in Japanese Patent Application Laid-open No. Hei 7-130652, Japanese Patent Application No. Hei 8-335152 and the like.) Active layers 302 to 304 having a film thickness of 50 nm are obtained by patterning the crystalline silicon film in a usual god photolithography step. Incidentally, only three TFTs are described in the present embodiment, but practically, a million or more TFTs are formed within a pixel matrix circuit.

Next, a silicon oxide film having a film thickness of 150 nm is formed as a gate insulating film 305. For the gate insulating film 305, a silicon oxide film, a silicon nitride film, a silicon nitride oxide film or a laminated film of these may be used in a film thickness of a range from 100 nm to 300 nm. Thereafter, a film mainly formed of aluminum (not shown) is formed by using a target containing 0.2 wt % of scandium on the gate insulting film, and an island-like pattern which serves as a prototype of a gate electrode is formed by patterning.

In the present embodiment, a technique disclosed in Japanese Patent Application Laid-open No Hei 7-135318 is used. Incidentally, for details, the same disclosure may be referred to.

First, an anodic oxidation is carried out in 3% of oxalic acid solution, while a resist mask used in patterning is remained on the above-mentioned island-like pattern. At this time, a formation current of a range from 2 mV to 3 mV is allowed to flow using a platinum electrode as a cathode, and an ultimate voltage is made 8 V. Thus, porous anodic oxide films 306 to 308 are formed.

Thereafter, an anodic oxidation is carried out in a solution neutralizing 3% of ethylene glycol solution of tartaric acid with aqueous ammonia after removing the resist mask. At this time, the formation current may be within a range of 5 mV to 6 mV and the ultimate voltage may be 100 V. Thus, fine anodic oxide films 309 to 311 are formed.

Figure 3A:
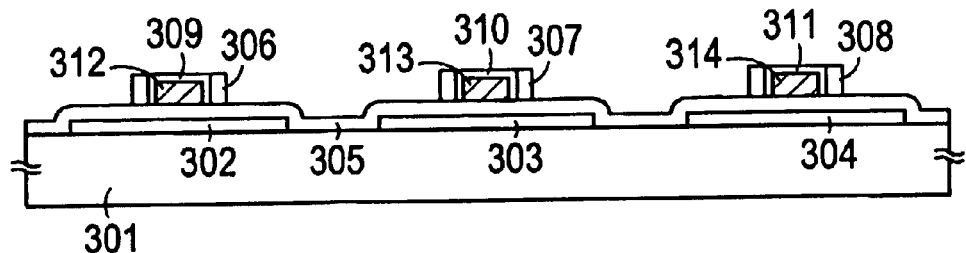
FIGS. 3A to 3D are sectional views showing an example of a manufacturing step according to Embodiment 1 of the present invention.

Then, the gate electrodes 312 to 314 are defined by the above-mentioned process. Incidentally, in the pixel matrix circuit, a gate line connecting each gate electrode at every 1 line is also formed at the same time when the gate electrode is formed (FIG. 3A).

Next, the insulating film 305 is etched using the anodic oxide films 306 to 311 and the gate electrodes 312 to 314 as the mask. Etching is carried out by dry etching method using $CF_4$ gas. As a result, gate insulating films having a shape shown as 315 to 317 are formed.

Then, the anodic oxide films 306 to 308 are removed by etching, and an impurity ion obtaining mono-conductivity in this state is added by ion-implantation or plasma doping method. In this case, if the pixel matrix circuit is formed in an N-type TFT, a P (phosphorous) ion may be added, whereas if the pixel matrix circuit is formed in a P-type TFT, a B (boron) ion may be added thereto.

Incidentally, adding process of the above-mentioned impurity ion is carried out by diving the step into two. A first time is carried out at high accelerating voltage of about 80 keV, and adjustment is performed so as to set a peak of the impurity ion under end portions (protrusions) of the gate insulating films 315 to 317. Then, a second time is carried out at low accelerating voltage of about 5 keV, and adjustment is performed so that the impurity ion may not be added under the end portions (protrusions) of the gate insulating films 315 to 317.

Figure 3B:
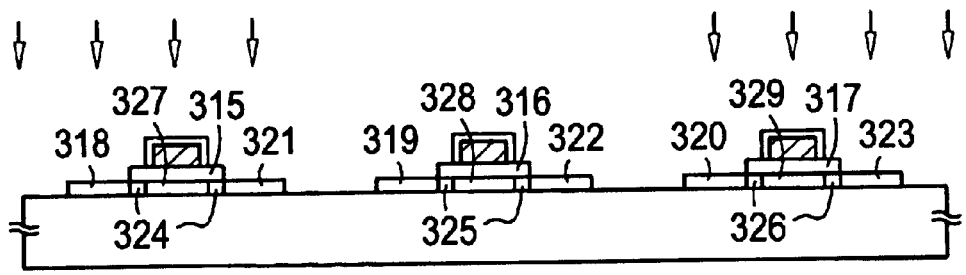

Thus, source regions 318 to 320, drain regions 321 to 323, lightly doped drain regions (also called as LDD region) 324 to 326, and channel form regions 327 to 329 of TFT are formed (FIG. 3B).

At this time, it is preferable that impurity ions are added to a source/drain region at a degree so that a sheet resistance of a range from 300 Ω/square to 500 Ω/square is obtained. Further, the lightly doped drain regions need to be optimized in correspondence with the performance of the TFT. Thermal treatment is conducted after completing the adding process of the impurity ions, and the r; activation of the impurity ions are carried out.

Figure 3C:
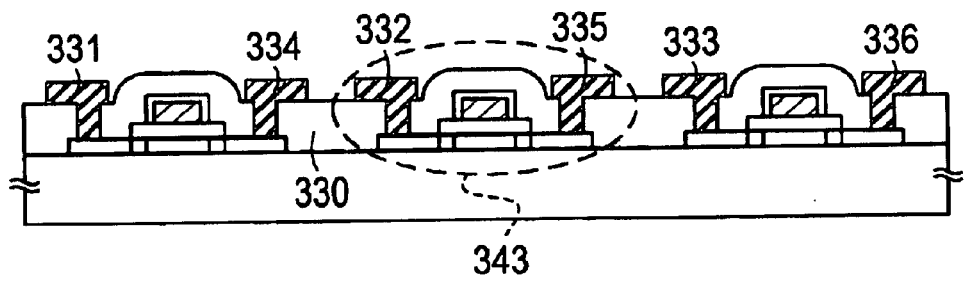

Next, a silicon oxide film is formed in a film thickness of 400 nm as a first interlayer insulating film 330, and source electrodes 331 to 333 and drain electrodes 334 to 336 are formed thereon (FIG. 3C). Further, for the first interlayer insulating film, silicon oxide nitride or other insulating materials may be used besides a silicon oxide film.

Incidentally, in this specification, an element formed in a region indicated by 343 in FIG. 3C is called a switching element (representatively, TFT, MIM element is also acceptable). Incidentally, in this specification, an interlayer insulating film 337 and a pixel electrode which are formed later are not included in the structure of the switching element.

Figure 3D:
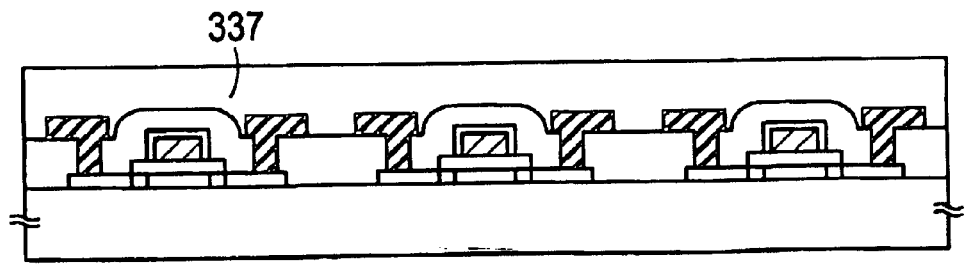

Next, a silicon oxide film is formed in a film thickness of a range from 0.5 to 1 $\mu$m as a second interlayer insulating film 337. Further, for the second interlayer insulating film 337, a silicon oxide nitride film, an organic resin film or the like may be used. For the organic resin film, polyimide, polyamide, polyimide-amide, acrylic, BCB (benzo-cyclobutene) or the like may be used. In the present embodiment, an acrylic film is formed in a film thickness of 1 $\mu$m (FIG. 3D).

Incidentally, after forming the second interlayer insulating film 337, flattening process such as CMP polishing may be taken place. It is preferable to perform the flattening process in such a condition that a height of the remaining irregularity (a distance perpendicular between a summit of a mountain and a bottom of a valley) is within 10% of a thickness of the pixel electrode which is formed later. By performing the flattening process, the film thickness of a dielectric multi-layer film to be formed later can be made uniform.

Then, a reflection layer formed of the dielectric multilayer film is formed on the second interlayer insulating film 337. A dielectric multilayer film 344 is formed by laminating several to several tens of dielectric films 341 with a low refractive index and dielectric films 342 with a high refractive index which are alternately laminated. Incidentally, each film thickness of the dielectric films need to be adjusted so that $\lambda/4$ film is obtained at the center wavelength of a required reflection wavelength range.

As materials to be used for the above-mentioned dielectric multilayer film 344, $SiO_2$, $MgF_2$, $Na_3AlF_6$, and the like may be used for the dielectric film 341 with a low refractive index, and $TiO_2$, $ZrO_2$, $Ta_2O_5$, ZnS, ZnSe, ZnTe, Si, Ge, $Y_2O_3$, $Al_2O_3$, and the like may be used for the dielectric film 342 with a high refractive index. It is to be noted that for other dielectric material having a low refractive index, an orientated layer, acrylic, polyimide (refractive index of 1.5 to 1.6) may also be used. Further, a transparent conductive film such as ITO (refractive index of 1.98) may be used.

In the present embodiment, for the dielectric film 341 with a low refractive index, $SiO_2$ (refractive index of 1.43) is used, and for the dielectric film 342 with a high refractive index, $TiO_2$ (refractive index of 2.2) is used.

Figure 4A:
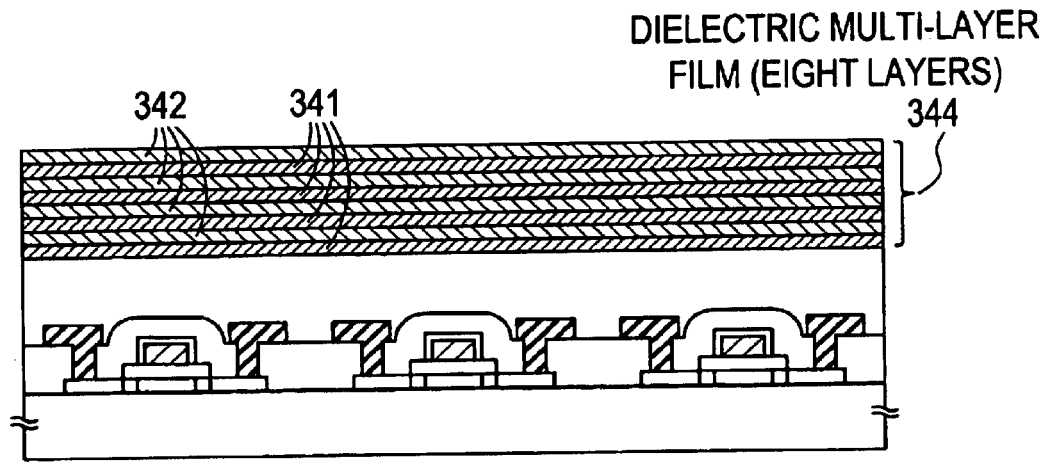
FIGS. 4A to 4C are sectional views showing an example of the manufacturing step according to Embodiment 1 of the present invention.

The film thickness of the dielectric multilayer film is adjusted to form the $\lambda/4$ film in a visible light region (400 nm<$\lambda$<700 nm). The range of the film thickness of the dielectric film with a low refractive index ($SiO_2$) to form the $\lambda/4$ film in the above-mentioned visible light region is 70 nm to 122 mm. Further, the range of the film thickness of the dielectric film with a high refractive index ($TiO_2$) to form the $\lambda/4$ film in the above-mentioned visible light region is 45.5 nm to 79.5 nm. If adjusted to such film thicknesses, rays of reflected light wavelength band needed film enhance with one another by an interference effect to effectively improve the reflectivity. In the present embodiment, the dielectric multilayer film is formed of, considering two layers of the dielectric film 341 with a low refractive index having a film thickness of 70=m and the dielectric film 342 with a high refractive index having a film thickness of 50 mm to be one set with each other, four sets, that is, a total of eight layers (960 nm) (FIG. 4A).

It should be noted that it is needless to say that the present invention is not limited to the material or the film thickness of each dielectric film described above, and it is possible to employ a structure in which the film thickness or the material of the respective dielectric films is appropriately changed to selectively set the reflection wavelength.

Incidentally, in the present embodiment, since it is desirable that the film thickness of the dielectric multilayer film formed on the interlayer insulating film is uniformly formed, sputtering method which is a well-known method is used. AS forming method of the above-mentioned dielectric multi-layer film, the present invention is not particularly limited to the present embodiment. Other methods including vacuum evaporation method, coating method, and the like are enumerated.

Figure 4B:
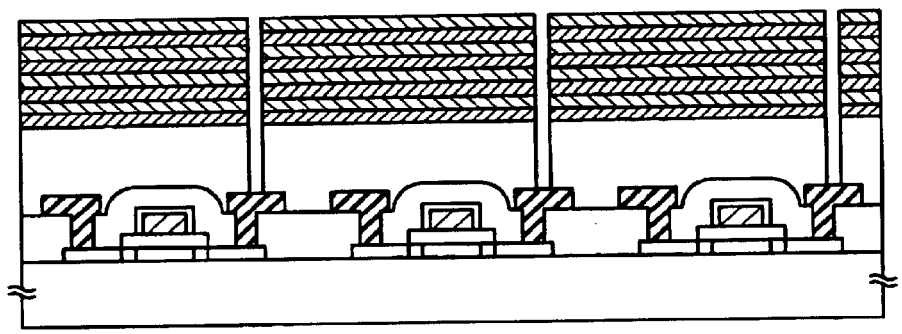

Subsequently, the dielectric multilayer films 341 and 342 and the interlayer insulating film 337 are etched to form contact holes. In the present embodiment, the dielectric multilayer film is wet-etched by using a hydrogen fluoride solution diluted to 1/100, i.e., an acid solution (FIG. 4B).

Figure 4C:
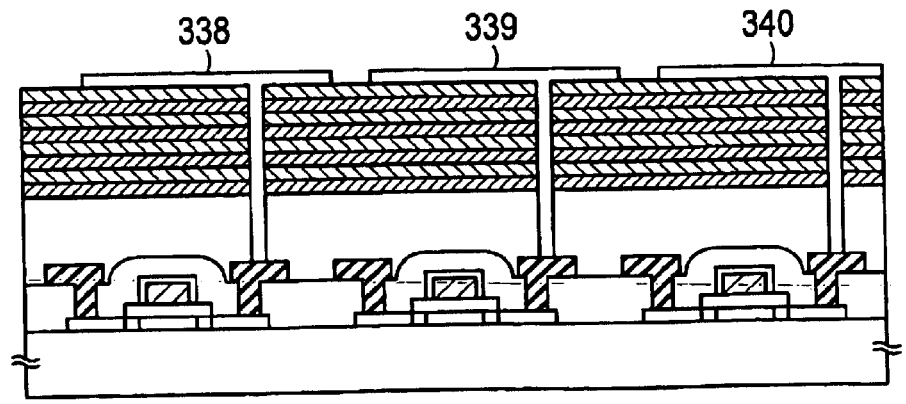

Then, a conductive film having transparency, that is, an ITO film having a film thickness of 120 nm in the present embodiment, is formed, and pixel electrodes 338 to 340 are formed by patterning. Thus, a state shown in FIG. 4C is obtained. Conventionally, a shielding film such as a black mask is required to be formed in a gap between the pixel electrodes. However, in the present embodiment, formation of the shielding film is not required, and the dielectric multilayer film formed downward of the gap between the pixel electrodes functions as a positive shielding to light from an oblique direction, thereby preventing the degradation of the switching element by light.

Next, the orientated layer is formed by a well-known method, that is, the coating method in the present embodiment.

As described above, the pixel matrix circuit is completed. Practically, a driver circuit, etc. for driving pixel TFTs is simultaneously formed on the same substrate. Such a substrate is generally called as a TFT-side substrate or an active matrix substrate. The active matrix substrate is referred to as a first substrate in this specification.

After the formation of the first substrate is completed, an opposing substrate (this substrate is referred to as a second substrate in this specification) in which a counter electrode is formed on a transparent substrate is adhered thereonto, and a liquid crystal layer is sandwiched therebetween. Thus, a reflection type LCD is completed.

Incidentally, this cell assembling process may be carried out in accordance with a well-known method. Further, it is possible to disperse a dichroism pigment to the liquid crystal layer or to form a color filter on the opposing substrate. Since the kinds of the liquid crystal layer, presence/absence of the color filter or the like is changed depending upon by which mode the liquid crystal is driven, the operator may properly decide it.

The reflection type LCD obtained by the above-mentioned 6 forming process is shown in FIG. 1. FIG. 1 is a schematic sectional id view of the present embodiment.

In a liquid crystal display panel manufactured in the present embodiment, between a substrate 110 and an opposing in substrate 119, a switching element 111, an interlayer insulating film 112, pixel electrodes 113, dielectric films 114 with a low refractive index, dielectric films 115 with a high refractive index, an orientated layer 116, a liquid crystal layer 117, an orientated layer 116, and a counter electrode 118 are formed on the substrate 110 in the stated order.

Incidentally, FIG. 1 corresponds to FIGS. 3A to 3D and FIGS. 4A to 4C. The interlayer insulating film in FIG. 1 corresponds to a second interlayer insulating film 337 in FIG. 3D. The pixel electrodes 113 in FIG. 1 correspond to the pixel electrodes 338 to 340 in FIG. 4C. The dielectric films 114 with a low refractive index in FIG. 1 correspond to the dielectric films 341 in FIG. 4A, and the dielectric films 115 with a high refractive index in FIG. 1 correspond to the dielectric films 342 in FIG. 4A.

The reflective index in the present embodiment (the dielectric multilayer film + the orientated layer) is similar to the conventional (a metal thin film + the orientated layer) reflective index (less than 80 to 90%). As described above, the present embodiment shows that the dielectric multilayer film is enough applicable as a reflection layer in place of the metal thin film. Therefore, if the number of layers, material, film thickness or the like of the dielectric multilayer film in the present embodiment is appropriately changed, the reflectivity can be enhanced compared to the conventional one. For example, five sets (ten layers) of the dielectric multilayer films are employed, 93.6% of reflectivity (see Table 1) is obtained in calculation, and in case of six sets (twelve layers), 97.1% is obtained in calculation. It should be noted that it is easy to increase the number of layers of the dielectric multilayer film in the structure of the present embodiment.

Further, although it is not shown in the present embodiment, the color filter may be arranged between the opposing substrate and the counter electrode.

Embodiment 2

In Embodiment 1, an example of the fabrication process is described in which a dielectric multilayer film consisting of eight layers is formed. A description will now be made of the present embodiment with reference to FIG. 2A, in which a dielectric material with a low refractive index is used as a second interlayer insulating film 337 to form a dielectric multilayer film consisting of seven layers. Until a process shown in FIG. 3C, the fabrication process is the same as that of the reflection type LCD shown in Embodiment 1. Therefore, only different portions will be described.

First, the structure shown in FIG. 3C is obtained using the same technique as that of the fabrication process shown in Embodiment 1. Then, for the second interlayer insulating film 337, a dielectric material having a low refractive index is used. In the present embodiment, as an interlayer insulating film 201 is formed an acrylic film having a film thickness of 1 $\mu$m.

Incidentally, in the case where the dielectric multilayer film that will be formed later is applicable as an insulator, such a structure is preferable in which a flattening process such as CMP is carried out to thin the film thickness of the interlayer insulating film 201, because the formation of the contact holes becomes easy in process, in particular.

According to the present embodiment, a dielectric film with a high refractive index ($ZrO_2$: 50 nm in film thickness) is formed on the interlayer insulating film 201. Thereafter, three sets of a dielectric film 202 with a low refractive index ($SiO_2$: 70 nm in film thickness) and a dielectric film 203 with a high refractive index ($ZrO_2$: 50 nm in film thickness), that is, a six-layer dielectric film having a film thickness of 720 nm is formed thereon. The respective film thicknesses of the dielectric films are adjusted so as to obtain $\lambda/4$ film in a visible light region (400 nm<$\lambda$<700 nm).

In the present embodiment, as the dielectric film 202 with a low refractive index, $SiO_2$ (a refractive index of 1.43 and a thickness range from 70 nm to 122 nm) is used, while as the dielectric film 201 with a high refractive index, $ZrO_2$ (a refractive index of 2.04 and a thickness range from 49 nm to 85.8 nm) is used.

As the dielectric material having a low refractive index other than $SiO_2$ employed in the present embodiment, $MgF_2$, $Na_3AlF_6$, an orientated layer, acryl, or polyimide (a refractive index of 1.5 to 1.6) may be used. Further, as the dielectric film with a high refractive index other than $ZrO_2$ employed in the present embodiment, $TiO_2$, $Ta_2O_5$, ZnS, ZnSe, ZnTe, Si, Ge, $Y_2O_3$, $Al_2O_3$ or the like may be used.

Then, contact holes are formed in a similar manner as in Embodiment 1, and a pixel electrode 205 formed of a transparent conductive film is formed. The interlayer insulating film 201 according to the present embodiment has a low refractive index. Thus, reflectivity can be obtained substantially equal to that in Embodiment 1 in which four sets of the dielectric film with a low refractive index and the dielectric film with a high refractive index are formed.

Figure 2B:
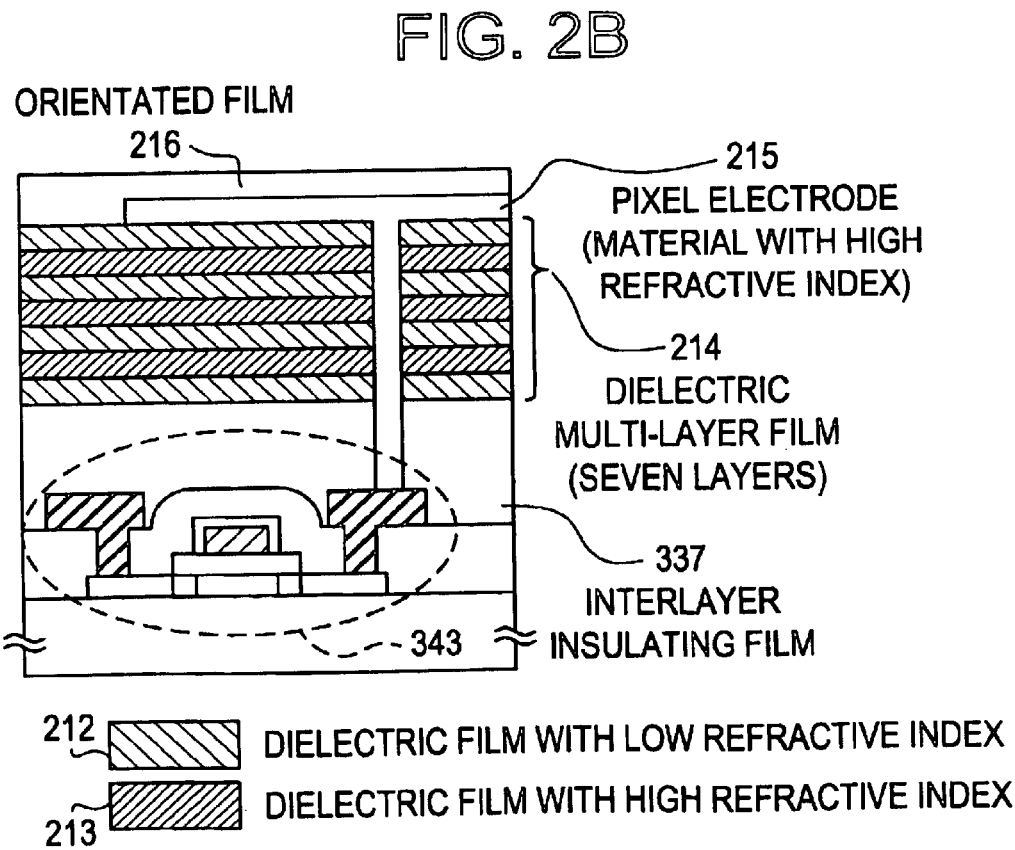

Thereafter, an orientated layer 206 is formed thereon as in Embodiment 1 to prepare a first substrate (FIG. 2A).

This structure allows a more simple formation of the contact holes to be achieved, compared with Embodiment 1, while the number of layers and the total film thickness of the dielectric multilayer film may be reduced.

Embodiment 3

In Embodiment 1, an example of the fabrication process is described in which a dielectric multilayer film consisting of eight layers is formed. The present embodiment will be described with reference to FIG. 2B, in which a seven-layer dielectric multilayer film is formed, on which a pixel electrode is formed using a material having a high refractive index. Incidentally, until a process shown in FIG. 3C, the fabrication process is the same as that of the reflection type LCD shown in Embodiment 1. Therefore, only different portions will be described.

First, a structure shown in FIG. 3C is obtained using the same technique as that of the manufacturing process shown in Embodiment 1.

Then, three sets of a dielectric film 212 with a low refractive index and a dielectric film 213 with a high refractive index, that is, a dielectric film having six layers is formed on a second interlayer insulating film 337. One layer of the dielectric film with a low refractive index is formed thereon, thereby forming a dielectric multilayer film 214 having seven layers.

In the present embodiment, three sets of the dielectric film with a low refractive index ($SiO_2$: 70 nm in film thickness) and the dielectric film with a high refractive index ($ZrO_2$: 50 nm in film thickness), that is a dielectric film having six layers is formed. However, it goes without saying that the present invention is not limited to the material, film thickness, the number of layers or the like according to the present embodiment. However, it is desirable that the respective film thicknesses of the dielectric films is adjusted so as to obtain $\lambda/4$ film in a visible light region (400 nm <$\lambda$<700 nm) in order to enhance the reflectivity efficiently.

Then, the contact holes are formed in a similar manner as in Embodiment 1, and a pixel electrode 215 (60 nm in film thickness) formed of a transparent conductive film with a high refractive index is formed. Since the transparent conductive film is utilized as a part of a reflection layer in the present embodiment, it is preferable that a film thickness of the pixel electrode is adjusted to a range from 50.5 nm to 88.4 nm so as to obtain $\lambda/4$ film in a visible light region (400 nm<A<700 nm). Such a film thickness allows reflectivity substantially equal to that in Embodiment 0.1 in which four sets of the dielectric film with a low refractive index and the dielectric film with a high refractive index are formed.

Thereafter, an orientated layer 216 is formed thereon as in Embodiment 1 to prepare a first substrate (FIG. 2B).

With such an arrangement, while the number of layers and the total film thickness of the dielectric multilayer film may be reduced, a more simple formation of the contact holes may be achieved, compared with Embodiment 1.

Incidentally, a combination of Embodiment 2 with the present embodiment to further reduce the number of layers will be conceivable. In this case, provision of the interlayer insulating film, the six-layer dielectric multilayer film 214 and the pixel electrode 215 can obtain substantially the same reflectivity as that in Embodiment 1.

Embodiment 4

In Embodiment 1, an example of the fabrication process is described in which a dielectric multilayer film consisting of eight layers is formed. The present embodiment will be described with reference to FIG. 5, in which an auxiliary capacitance is formed by using a pixel electrode and a dielectric multilayer film. Incidentally, until a process shown in FIG. 3C, fabrication process is the same as that of the reflection type LCD shown in Embodiment 1. Therefore, only different portions will be described.

First, a structure shown in FIG. 3C is obtained using the same technique as that of the fabrication process shown in Embodiment 1.

Subsequently, three sets of a dielectric film 501 with a low refractive index and a dielectric film 502 with a high refractive index, that is, a six-layer dielectric film is formed on an interlayer insulating film. One layer of the dielectric film with a low refractive index is formed thereon, thereby forming a dielectric multilayer film 500.

In the present embodiment, a common electrode 503 (a first transparent conductive film) made of a material having a high refractive index is formed thereon, and is then patterned. One layer of the dielectric film with a low refractive index is formed thereon. After forming contact holes, a second transparent conductive film made of a material having a high refractive index is formed again, and is then patterned, to thereby form a pixel electrode 504. The common electrode 503 formed of the first transparent conductive film is connected to a common line.

It is preferable that the film thicknesses of the common electrode 503 (the first transparent conductive film) and the pixel electrode 504 (the second transparent conductive film), which are both used as parts of a reflection layer, are adjusted within a both used as parts range from 50.5 nm to 88.4 nm so as to obtain A/4 film in a visible light region (400 nm<A<700 nm). Such a film thickness allows a reflectivity of 93.6% (in calculation) substantially equal to the case where five sets of a dielectric film with a low refractive index and a dielectric film with a high refractive index are formed.

Figure 5:
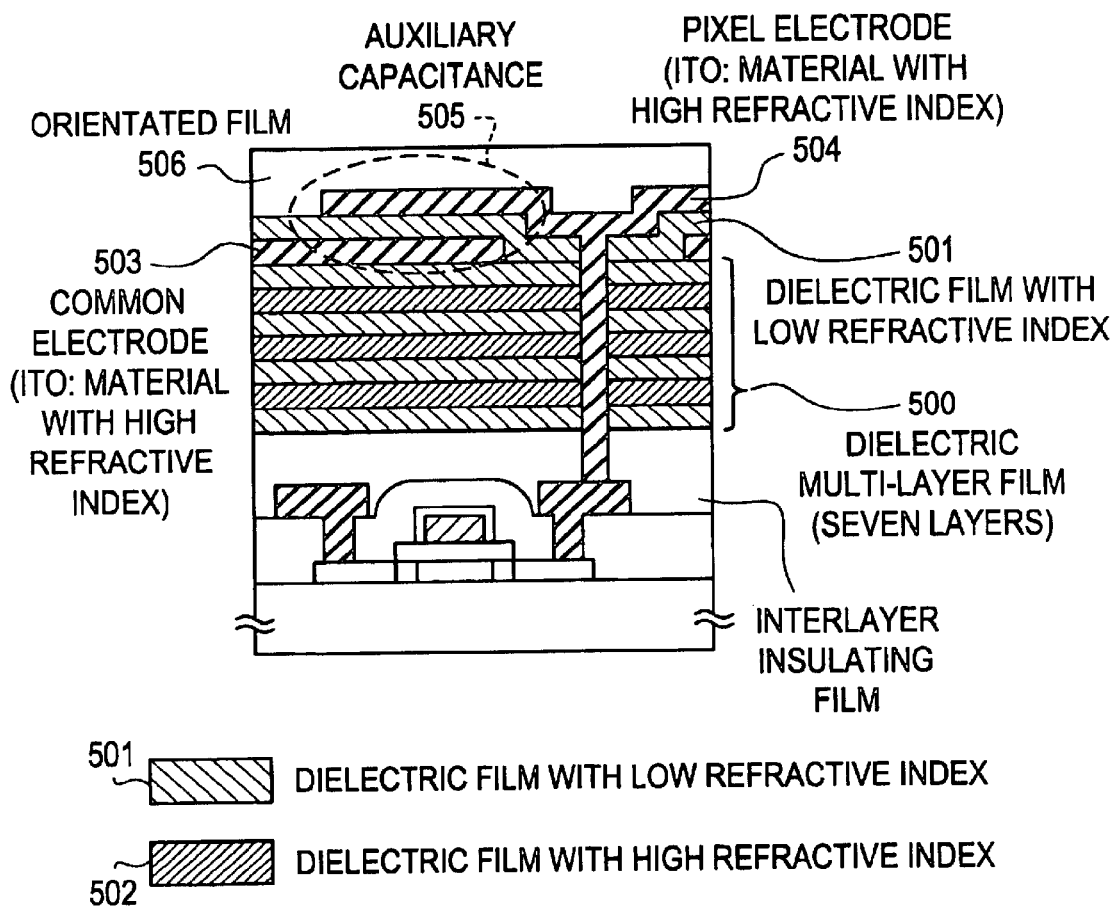
FIG. 5 is a sectional view showing an example of a structure according to Embodiment 4 of the present invention.

Thereafter, an orientated layer 506 is formed thereon as in Embodiment 1 to prepare a first substrate (FIG. 5).

Employment of such a structure shown in FIG. 5 allows an auxiliary capacitance 505 to be formed by the common electrode 503 (the first transparent conductive film), the dielectric film 501 with a low refractive index, and the pixel electrode 504 (the second transparent conductive film). This auxiliary capacitance can practically be sufficient in capacitance.

Incidentally, a combination of the present embodiment with Embodiment 2 or 3 will be conceivable.

Embodiment 5

In Embodiment 4, an example of the fabrication process is described in which the auxiliary capacitance is formed by using the pixel electrode and the dielectric multilayer film. The present embodiment will be described with reference to FIG. 6A (capacitive configuration 1), in which an auxiliary capacitance 605 is formed by using a pixel electrode 604, a dielectric film 601 with a low refractive index, and a common electrode 602 formed of a transparent conductive film. Incidentally, until a process shown in FIG. 3C, fabrication process is the same as that of the reflecting LCD shown in Embodiment 1, only different portions will be described.

First, a structure shown in FIG. 3C is obtained using the same technique as that of the fabrication process shown in Embodiment 1.

Subsequently, a film, such as an ITO film, formed of the first transparent conductive film is formed and patterned to obtain the common electrode 602 which is then covered to form the dielectric film 601 with a low refractive index. This process is repeated twice, to form a reflection layer.

Then, the contact holes are then formed. In the structure of the present embodiment, only an interlayer insulating film and the dielectric film 601 with a low refractive index are laminated on a contact hole formation region. Therefore, the dielectric film with a low refractive index made of the same material will permit an etching operation to be relatively facilitated.

Subsequently, a second transparent conductive film made of a material having a high refractive index is formed and is then patterned, to thereby form the pixel electrode 604. Incidentally, the common electrode 602 is connected to a common line.

It is preferable that the thickness of the common electrode 602 (the first transparent conductive film) and the pixel electrode (the second transparent conductive film) 604, which are both used as parts of a reflection layer, are adjusted within a range from 50.5 nm to 88.4 nm so as to obtain $\lambda/4$ film in a visible light region (400 nm<$\lambda$<700 nm).

Thereafter, an orientated layer 606 is formed thereon as in Embodiment 1 to prepare a first substrate (FIG. 6A).

Employment of such a structure shown in FIG. 6A allows the auxiliary capacitance 605 to be formed by the common electrode 602, the dielectric film 601 with a low refractive index, and the pixel electrode 604. It is to be noted that the dielectric film 602 with a low refractive index may be formed with a capacitance even in a floating state. Hence, a capacitance may be formed between the common electrodes 602 that sandwiches therebetween the dielectric film 601 with a low refractive index. The auxiliary capacitance 605 can be freely designed by optionally changing the material, film thickness, the number of laminated layers, and the like.

Incidentally, a combination of the present embodiment with Embodiment 2 or 3 will be conceivable.

Embodiment 6

In Embodiment 5, an example of the fabrication process is described in which the auxiliary capacitance is formed by using the pixel electrode, the dielectric film with a low refractive index, and the common electrode formed of a transparent conductive film. The present embodiment will be described with reference to FIG. 6B (capacitive configuration 2), in which a larger auxiliary capacitance is formed. Until a process shown in FIG. 3C, the fabrication process is the same as that of the reflection type LCD shown in Embodiment 1. Therefore, only different portions will be described.

First, a structure shown in FIG. 3c is obtained using the same technique as that of the fabrication process shown in Embodiment 1.

Subsequently, a film, such as an ITO film, formed of a first transparent conductive film is formed and patterned to obtain a common electrode 612 which is then covered to form a dielectric film having a low refractive film 611.

Then, after forming a first contact hole, a capacitance electrode 613 formed of a transparent conductive film is formed, and is connected to a drain electrode of a switching element.

Thereafter, the dielectric film 611 with a low refractive index is formed over the capacitance electrode 613. Then, again, a film, such as an ITO film, formed of the first transparent conductive film is formed and patterned to obtain the common electrode 612 which is then covered to form the dielectric film having a low refractive film 611.

Subsequently, after forming a second contact hole, the pixel electrode 614 formed of a transparent conductive film is formed by patterning, and is connected to the capacitance electrode 613.

Incidentally, the common electrode 612 is connected to a common line. However, all the common electrodes are not necessarily connected thereto, but any of them may be appropriately connected thereto.

The arrangement thus obtained by the above process makes it possible to form an auxiliary capacitance constructed by the pixel electrode 614, the dielectric film 611 with a low refractive index, and the common electrode 612, and to form an auxiliary capacitance constructed by the pixel electrode 613, the dielectric film 611 with a low refractive index, and the common electrode 612.

As described above, a larger auxiliary capacitance without opening ratio being reduced according to the present embodiment may be particularly useful for a projector unit using a highly precise fine panel.

Embodiment 7

In the present embodiment, an example will be described in which a TFT having a structure different from the structure of the TFT shown in Embodiment 1 is utilized as a semiconductor device for driving an active matrix. Incidentally, the TFT having the structure described in the present embodiment may be readily applied to Embodiments 2 to 6.

In Embodiments 1 to 6, a coplanar type TFT that is a representative one of top gate type TFTs are described as an example. However, it may be replaced by a bottom gate type TFT. Shown in FIG. 7 is an example where a reversed stagger type TFT as an exemplary bottom gate type TFT is used.

Figure 7:
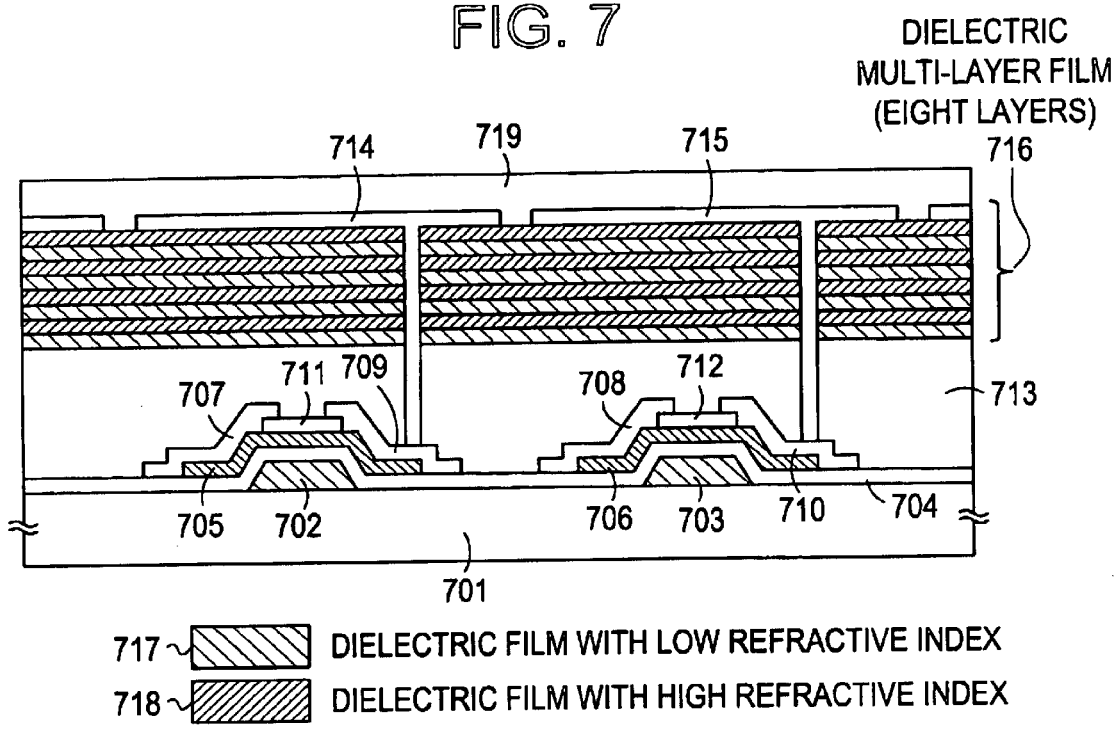
FIG. 7 is a sectional view showing an example of a structure according to Embodiment 7 of the present invention.

In FIG. 7, reference numeral 701 denotes a glass substrate; 702 and 703, gate electrodes; 704, a gate insulating film; 705 and 706, active layers. Each of the active layers 705 and 706 consists of a silicon film in which impurities are intentionally not added.

Reference numerals 707 and 708 denote source electrodes; 709 and 710, drain electrodes; 711 and 712, silicon nitride films to be channel stoppers (or etching stoppers). That is, of the active layers 705 and 706, regions situated below the channel stoppers 711 and 712 function substantially as channel formation regions.

The above description is directed to the basic structure of the reversed stagger type TFT.

In the present embodiment, that sort of reversed stagger type TFT is covered with an interlayer insulating film 713 comprised of an organic resin film so as to be flattened, a dielectric multi-layer film 716 (dielectric films 717 with a low refractive index and dielectric films 718 with a high refractive index) of the present invention is formed on the interlayer insulating film, and pixel electrodes 714 and 715 are formed thereon to form an orientated layer 719.

Next, an example will be described in which an insulating gate type field effect transistor (IGFET) is formed as a semiconductor device of the present invention. Incidentally, IGFET is called also as MOSFET, and designates a transistor formed on a silicon wafer.

Figure 8:
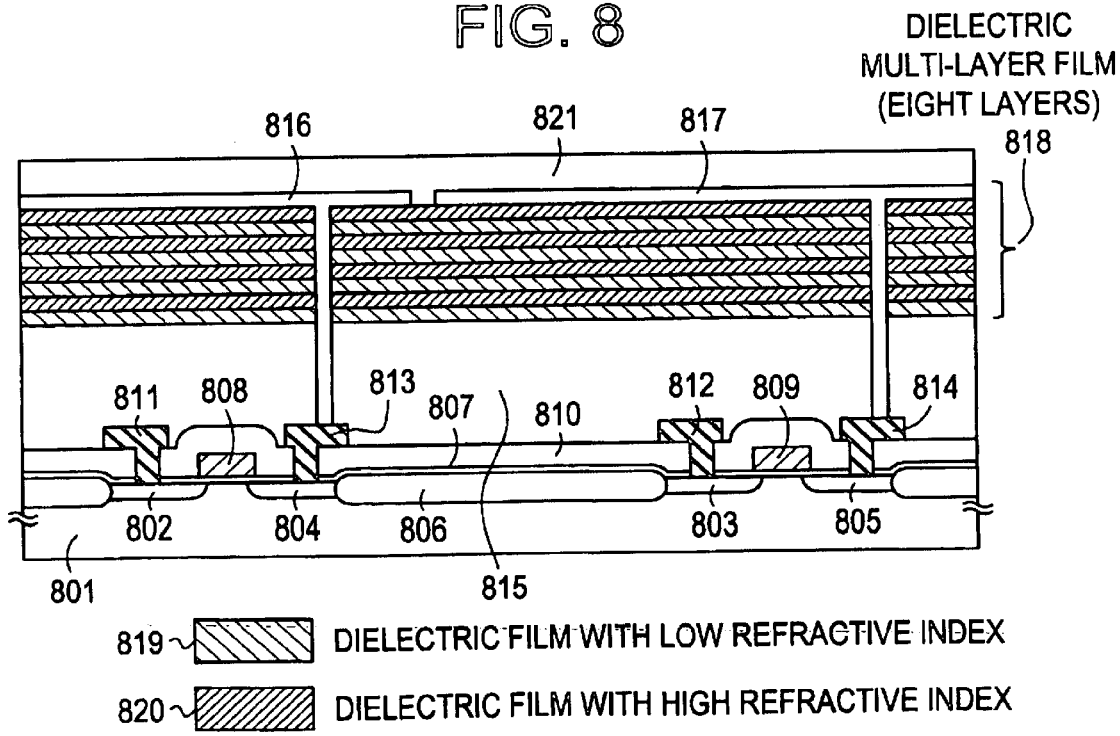
FIG. 8 is a sectional view showing an example of the structure according to Embodiment 7 of the present invention.

In FIG. 8, reference numeral 801 denotes a glass substrate; 802 and 803, source regions; 804 and 805, drain regions. A source/drain region is formed by adding impurities through ion implantation and diffusing the impurities thermally. Reference numeral 806 denotes an oxide for separating a device, which can be formed using an ordinal technique of LOCOS.

A gate insulating film is denoted by reference numeral 0.807; gate electrodes by 808 and 809; a first interlayer insulating film by 810; source electrodes by 811 and 812; drain electrodes by 813 and 814. The top thereof is flattened by a second interlayer insulating film 815 to form on the flattened surface a dielectric multi-layer film 818 (dielectric films 819 with a low refractive index and dielectric films 820 with a high refractive index) of the present invention and to form pixel electrodes 816 and 817. Then an orientated layer 821 is formed.

Incidentally, the present invention may be applied also to an active matrix display that uses a thin film diode, MIM device, varistor device, etc. other than IGFET, top gate type or bottom gate type TFT shown in the present embodiment.

As shown in the present embodiment hereinabove, the present invention is applicable to a reflection type LCD using a semiconductor device having any structure.

Embodiment 8

The present embodiment explains the case in which a TFT is formed with different process from Embodiment 1 with reference to FIG. 9. Incidentally, the present embodiment is identical with Embodiment 1 except that a part of which is different.

First, a structure shown in FIG. 3D is obtained in accordance with the process of Embodiment 1.

Subsequently, a reflection layer 1341 of a metal material is formed on the second insulating film. The reflection layer 1341 in the present embodiment is formed by patterning a metal film containing as a main component aluminum (film thickness of 200 nm) formed by sputtering. Incidentally, FIG. 10 shows one example of a pattern of the reflection layer, that is, it is necessary to form an aperture so as not to connect electrically with a switching element and a pixel electrode formed in the later process.

The above-mentioned reflection layer 1341 is not particularly limited so long as it is a metal material having reflectivity, and it is preferable to use, for example, a high reflectivity white metal material such as aluminum, silver, rhodium, nickel, or an alloy material containing those as the main components.

Next, the above-mentioned reflection layer 1341 is covered to form a dielectric film 1342. For the dielectric film 1342, any material may be used so long as it is a dielectric (insulating material) having transparency. In the present embodiment, a low refractive index dielectric material ($SiO_2$) is used to enhance the reflectivity.

It is desirable to use $SiO_2$, $MgF_2$, $Na_3AlF_6$ or the like for the above-mentioned low refractive index dielectric material, and it is desirable to use an orientated layer, acrylic, and polyimide (refractive index of 1.5 to 1.6) for other low refractive index dielectric materials.

Figure 11A:
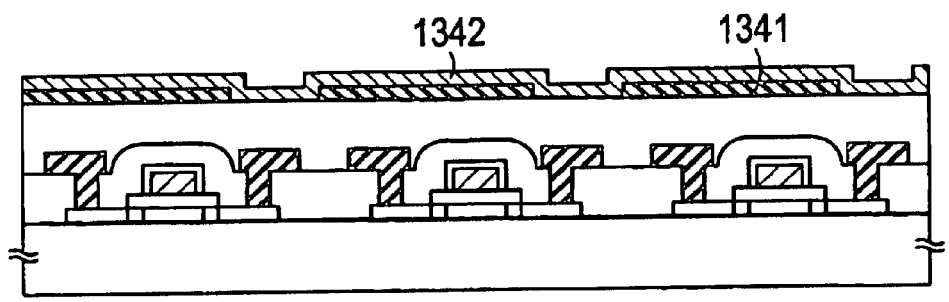
FIGS. 11A to 11C are sectional views showing an example of a manufacturing step according to Embodiment 8 of the present invention.

It is to be noted that it is preferable to adjust the film thickness of the above-mentioned dielectric film to form a $\lambda/4$ film in a visible light region (400 nm<A<700 nm). The range of the film thickness of the dielectric film with a low refractive index ($SiO_2$) to form the $\lambda/4$ film in the above-mentioned visible light region is 70 nm to 122 nm. For the dielectric film 1342 with a low refractive index, $SiO_2$ (refractive index of 1.43) is formed in the film thickness of 80 nm (FIG. 11A). Incidentally, reflectivity is enhanced with this dielectric film with a low refractive index and a pixel electrode formed later.

Figure 11B:
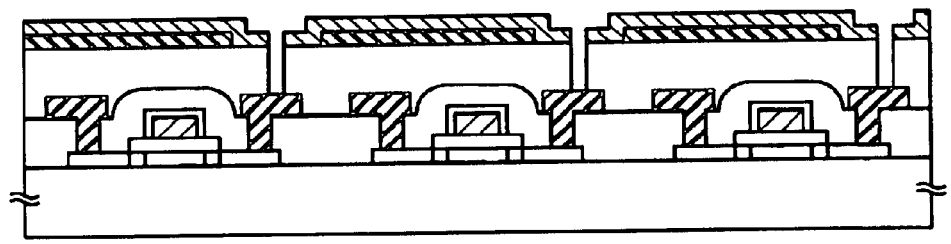

Next, the formation of a contact hole for connecting the pixel electrode formed in the subsequent process with a switching element 343 is carried out (FIG. 11B).

Although, in the present embodiment, an interlayer insulating film 1337 and the dielectric film 1342 with a low refractive index are formed with different materials, in case of using the same material (a silicon oxide film, an acrylic film or the like), since the etching rate is identical with each other, an etching process can be performed readily and this is preferable. Incidentally, in case of using a different material, the etching process may be divided into a plurality of steps and carried out.

Figure 11C:
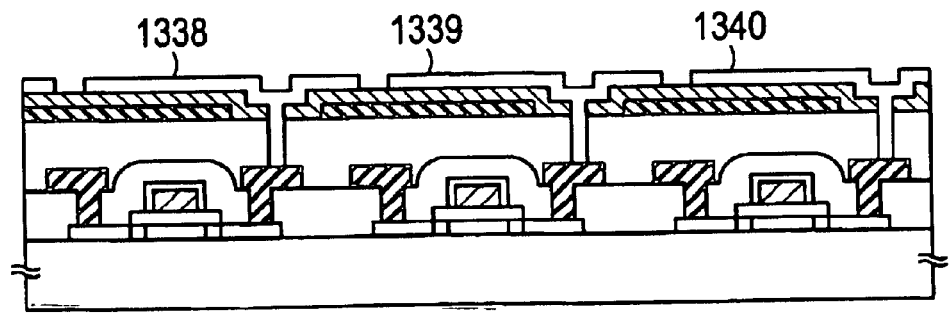

Thereafter, a thick transparent conductive film (40 nm to 150 nm) is formed, and then patterned to obtain pixel electrodes 1338 to 1340 which are connected electrically with a switching element 1343 (FIG. 11C).

For the above-mentioned pixel electrodes 1338 to 1340, a material having enough transparency and conductivity, for example, ITO (Indium Tin Oxide), $SnO_2$ (tin oxide), etc. may be used.

It should be noted that it is preferable to also adjust the film thickness of the pixel electrode to form a $\lambda/4$ film in a visible light region (400 nm<A<700 nm). The range of the film thickness of a material film with high refractive index (ITO: refractive index of 1.98) to form the $\lambda/4$ film in the above-mentioned visible light region, is 50.5 nm to 88.4 nm.

If the film thickness is adjusted to the above-mentioned range, rays of required reflected wavelength band enhance with one another by an interference effect, thereby being capable of effectively reflecting the rays. In the present embodiment, the reflectivity can be enhanced by the dielectric film 1342 with a low refractive index having a film thickness of 80 nm and the pixel electrodes (material having a high refractive index) having a film thickness of 60 nm. Thus, a reflectivity substantially equal to the case where one set of a dielectric film with a low refractive index id and a dielectric film with a high refractive index is formed on a metal film can be obtained.

Incidentally, it is needless to say that the present invention is not limited to the material or the film thickness of each dielectric film described above, and it is possible to employ a structure in which the film thickness or the material of the respective dielectric films is appropriately changed to selectively set the reflection wavelength. Further, a process for forming the above-mentioned dielectric film may be carried out by using sputtering method, vacuum evaporation method, coating method, and the like.

Further, as shown in FIGS. 11A to 11C, the pixel electrodes 1338 to 1340 and the reflection layer 1341 are insulated by the dielectric multilayer film 1342. Since there is no electrical connection therebetween, an auxiliary capacitance 1344 is formed due to a potential difference. Although not shown, preferably, a common potential is formed by connecting the reflection layer 1341 to a common line, resulting in a larger capacitance.

Next, the orientated layer is formed by a well-known method, that is, the coating method in the present embodiment.

As described above, formation of a pixel matrix circuit is completed. Practically, a driver circuit or the like for driving pixel TFTS is simultaneously formed on the same substrate.

After forming the first substrate, an opposing substrate (this substrate is referred to as a second substrate in this specification) in which a counter electrode is formed on a transparent substrate is adhered thereonto, and a liquid crystal layer is sandwiched therebetween. Thus, a reflection type LCD is completed.

Incidentally, this cell assembling process may be carried out in accordance with a well-known method. Further, it is possible to disperse a dichroism pigment to the liquid crystal layer or to form a color filter on the opposing substrate. Since the kinds of the liquid crystal layer, presence/absence of the color filter or the like is changed depending upon by which mode the liquid crystal is driven, the operator may properly decide it.

The reflection type LCD obtained by the above-mentioned forming process is shown in FIG. 9. FIG. 9 is a schematic sectional view of the present embodiment.

In a liquid crystal display panel manufactured in the present embodiment, between a substrate 1110 and an opposing substrate 1119, a switching element 1111, an interlayer insulating film 1112, a reflection layer 1113, a dielectric film 1114 with a low refractive index, pixel electrodes 1115, an orientated layer 1116, a liquid crystal layer 1117, an orientated layer 1116, and a counter electrode 1118 are formed on the substrate 1110 in the stated order.

Incidentally, FIG. 9 corresponds to FIGS. 11A to 11C. The pixel electrodes 1115 in FIG. 9 correspond to the pixel electrodes 1338 to 1340 in FIG. 1C. The dielectric film 1114 with a low refractive index in FIG. 9 corresponds to the dielectric films 1342 in FIG. 11A, and the reflection layers 1113 in FIG. 9 correspond to the reflection layers 1341 in FIG. 11A.

Employing a structure of the present embodiment, that is, a structure shown in FIG. 9 is employed, the reflectivity of a range from 93% to 95% may be obtained. If such a structure in that the orientated layer is laminated, is employed, the reflectivity of about 90% may be obtained.

Further, although it is not shown in the present embodiment, the color filter may be arranged between the opposing substrate and the counter electrode.

Embodiment 9

In Embodiment 8, an example of the fabrication process is described in which one layer of the dielectric film having an adjusted film thickness and the pixel electrode are formed. A description will now be made of the present embodiment with reference to FIG. 13, in which a dielectric multilayer film (three layers) is formed on a reflection layer. Until a process shown in FIG. 3D, the fabrication process is the same as that of the reflection type LCD shown in Embodiment 1. Therefore, only different portions will be described.

First, a structure shown in FIG. 9A is obtained using the same technique as that of the fabrication process shown in Embodiments 1 and 8.

Subsequently, a dielectric multilayer film 1603 is formed on a reflection layer. A dielectric film with a high refractive index ($TiO_2$: 50 nm in film thickness) and a dielectric film with a low refractive index ($SiO_2$: 70 nm in film thickness) are formed on a dielectric film with a low refractive index ($SiO_2$: 70 nm in film thickness). The respective thicknesses of the dielectric films are adjusted so as to obtain $\lambda/4$ film in a visible light region (400 nm $<\lambda<$ 700 nm).

In the present embodiment, as the dielectric film with a low refractive index, $SiO_2$ (a refractive index of 1.43 and a film thickness of a range from 70 nm to 122 nm) is used, while as the dielectric film with a high refractive index, $TiO_2$ (a refractive index of 2.2 and a film thickness of a range from 45.5 nm to 79.5 nm) is used.

As the dielectric material having a low refractive index other than $SiO_2$ employed in the present embodiment, $MgF_2$, $Na_3AlF_6$, an orientated layer, acryl, or polyimide (a refractive index of 1.5 to 1.6) may be used. Further, as the dielectric film with a high refractive index other than $TiO_2$ employed in the present embodiment, $ZrO_2$, $Ta_2O_5$, $ZnS$, $ZnSe$, $ZnTe$, $Si$, $Ge$, $Y_2O_3$, $Al_2O_3$ or the like may be used.

It goes without saying that the present invention is not limited to the material or thickness of the above-noted dielectric films. It is possible to employ a structure in which the film thickness or the material of the respective dielectric films is appropriately changed to selectively set the reflection wavelength.

Then, the dielectric multilayer film 1603 and an interlayer insulating film are etched to form contact holes. In the present embodiment, the dielectric multilayer film is wet-etched by using a hydrogen fluoride solution diluted to 1/100, i.e., an acid solution.

A pixel electrode 1604 formed of a transparent conductive film is formed thereon. The pixel electrode may be made up of a material having sufficient transparency and conductivity such as ITO (indium tin oxide) and $SnO_2$ (tin oxide). The present embodiment adopts as the pixel electrode the ITO with a high refractive index. Thus, if the film thickness of the pixel electrodes is adjusted within a range of 50.5 nm to 88.4 nm, a reflectivity substantially equal to the case where two sets of a dielectric film with a low refractive index and a dielectric film with a high refractive index are formed can be obtained (in calculation, a reflectivity of 94.7% with an orientated layer formed on the pixel electrode).

Thereafter, an orientated layer is formed thereon as in Embodiment 8 to prepare a first substrate.

Incidentally, according to the present embodiment, the pixel electrode 1604 and the reflection layer 1602 are insulated by the dielectric multilayer film 1603. Since there is no electrical connection therebetween, an auxiliary capacitance 1605 is formed due to a potential difference. Although not shown, preferably, a common potential is formed by connecting the reflection layer 1602 to a common line, resulting in a larger capacitance.

This arrangement allows reflectivity to be more enhanced than that in the prior art.

Embodiment 10

In Embodiment 8, an example of the fabrication process is described in which one layer of the dielectric film having an adjusted film thickness and the pixel electrode are formed. A description will now be made of the present embodiment with reference to FIGS. 14 and 15, in which a capacitance electrode is formed under an opening in the reflection layer. Incidentally, until a process shown in FIG. 3d, the fabrication process is the same as that of the reflection type LCD shown in Embodiment 1, only different portions will be described.

First, a structure shown in FIG. 3D is obtained using the same technique as that of the fabrication process shown in Embodiment 1.

Subsequently, the interlayer insulating film 337 is etched to form contact holes. A metallic film having a reflectivity is patterned to form a capacitance electrode 1702.

It is preferred that this capacitance electrode is formed with at least a larger pattern than an opening in the reflection layer 1704 which will be formed in a later stage, and a portion where the capacitance electrode overlaps with the reflection layer 1704 through the dielectric film 1703 is allowed to serve as a capacitance. Up to this stage employed is a traditional process in which the reflection layer is used as the pixel electrode.

Figure 15A:
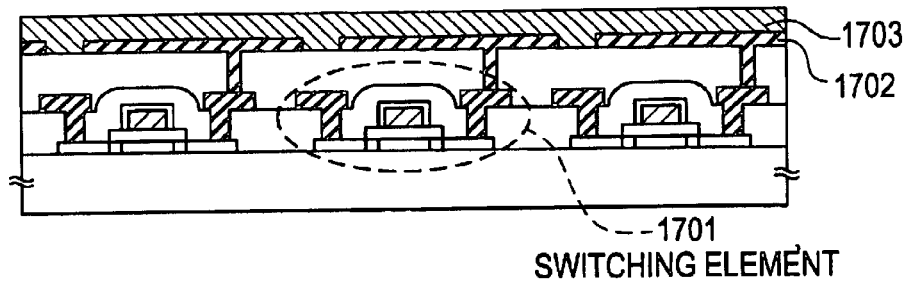
FIGS. 15A to 15D are sectional views showing an example of a manufacturing step according to Embodiment 10 of the present invention.

An acrylic film having a film thickness of 1 μm is then formed as the dielectric film 1703 (FIG. 15A). For the dielectric film, any material may be used so long as it is a dielectric (insulating material) having transparency. In the present embodiment, CMP is used to apply a flattening process to the dielectric film, although not shown.

The reflection layer 1704 made of a metal material is formed on the dielectric film 1703. The reflection layer 1704 according to the present embodiment is formed by patterning a metallic film (200 nm in film thickness) containing as a main component aluminum formed by sputtering method. Incidentally, as shown in FIG. 10 as an example of patterning the reflection layer, an opening is provided so as not to avoid the reflection layer from being electrically connected to the switching element and the pixel electrode that will be formed in a later stage. The capacitance electrode 1702 is provided under the opening.

The reflection layer 1704 is not particularly limited so long as it is a metal material having reflectivity. For example, white metal material having a high reflectivity such as aluminum, silver, rhodium, and nickel, or alloy material containing these as a main component, is preferably used.

Figure 15B:
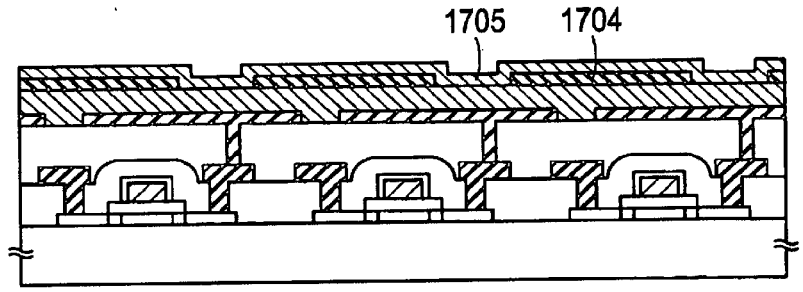

A dielectric film is formed over the reflection layer 1704. For the dielectric film, any material may be used so long as it is a dielectric (insulating material) having transparency. However, the present embodiment adopts a dielectric film 1705 with a low refractive index ($SiO_2$), in which a film thickness is within a range from 70 nm to 122 nm so as to obtain $\lambda/4$ film in a visible light region (400 nm<A<700 nm), in order to improve the reflectivity (FIG. 15B).

Figure 15C:
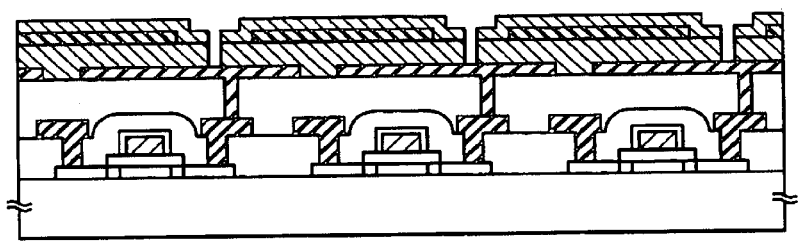
Figure 15D:
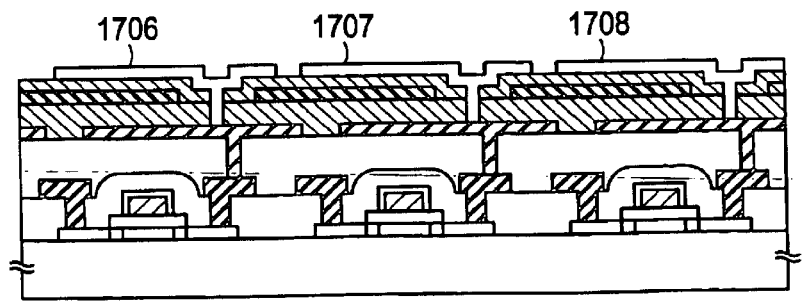

Subsequently, the formation of contact holes are completed (FIG. 15C). In the structure of the present embodiment, the capacitance electrode is allowed to function as an etching stopper, and therefore an etching operation will be relatively readily carried out. Preferably, the dielectric film 1703 and the B dielectric film 1705 with a low refractive index are made up of the same material, so that an etching rate may be made identical, thereby readily forming good contact holes having less etch residue.

A conductive film having transparency, for example, an ITO film in the present embodiment, is then formed to be 50 nm in film thickness, and is then patterned to form pixel electrodes 1706 to 1708. The respective thicknesses of the pixel electrodes are adjusted so as to obtain $\lambda/4$ film in a visible light region (400 nm <$\lambda$<700 nm). The film thickness of the material film (ITO) with a high refractive index with which the dielectric multi-layer film becomes the $\lambda/4$ film in the visible light region (400 nm<A<700 nm), is within a range of 50.5 nm to 88.4 nm.

Incidentally, it has conventionally been required that a light shielding film such as a black mask is formed in a gap defined between the pixel electrodes. However, according to the present invention, none of such a need exists, and the reflection layer and the capacitance electrodes 1702 formed below the opening defined between the reflection layer have a function of positively shielding from light, thereby being capable of preventing light leak and the deterioration due to light at the switching element.

The structure shown in FIG. 14 allows a first auxiliary capacitance 1708 to be formed by the reflection layer 1704, the dielectric film 1703, and the capacitance electrode 1702. It further allows a second auxiliary capacitance 1709 to be formed by the reflection layer 1704, the dielectric film 1705 with a low refractive index, and the pixel electrode 1706.

Although not shown, a common potential is formed by connecting the reflection layer 1704 to a common line. The reflection layer can be formed with a capacitance even in a floating state. The auxiliary capacitances 1708 and 1709 can be freely designed by appropriately changing the material, film thickness, the number of layers to be laminated, and the like of the respective parts that constitute the capacitances.

As described above, since larger auxiliary capacitances can be achieved regardless of the pixel area, the present embodiment may be particularly useful for a projector unit using a highly precise fine panels.

Incidentally, a combination of Embodiment 10 with Embodiment 8 or 9 will be conceivable.

Embodiment 11

In the present embodiment, an example will be described in which a TFT having a structure different from the structure of the TFTs shown in Embodiments 8 to 10 is utilized as a semiconductor device for driving an active matrix. Incidentally, the TFTs having the structure described in the present embodiment may be readily applied to Embodiments 8 to 10.

In Embodiments 8 to 10, a coplanar type TFT that is a representative one of top gate type TFTs are described as an example. However, it may be replaced by a bottom gate type TFT. Shown in FIG. 16 is an example where a reversed stagger type TFT as an exemplary bottom gate type TFT is used.

Figure 16:
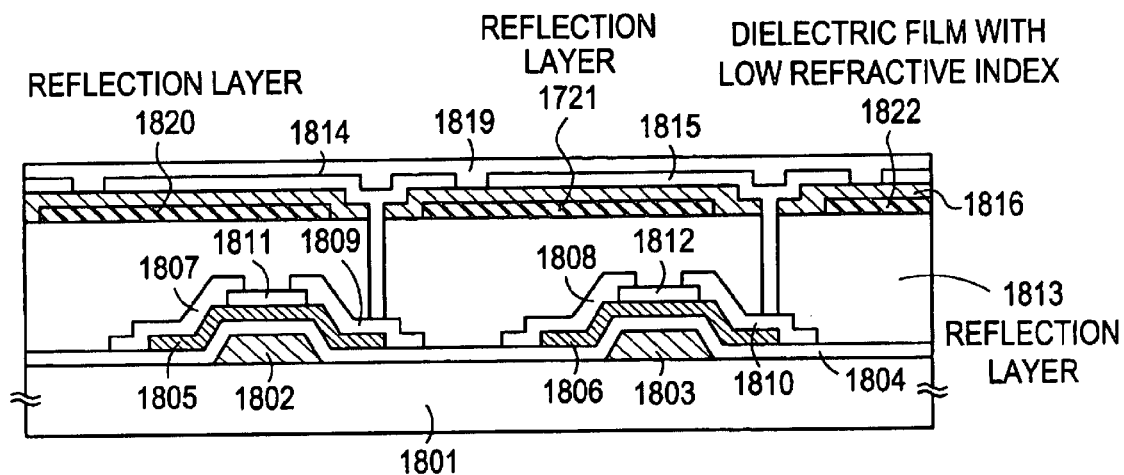
FIG. 16 is a sectional view showing an example of a structure according to Embodiment 11 of the present invention.
Figure 17:
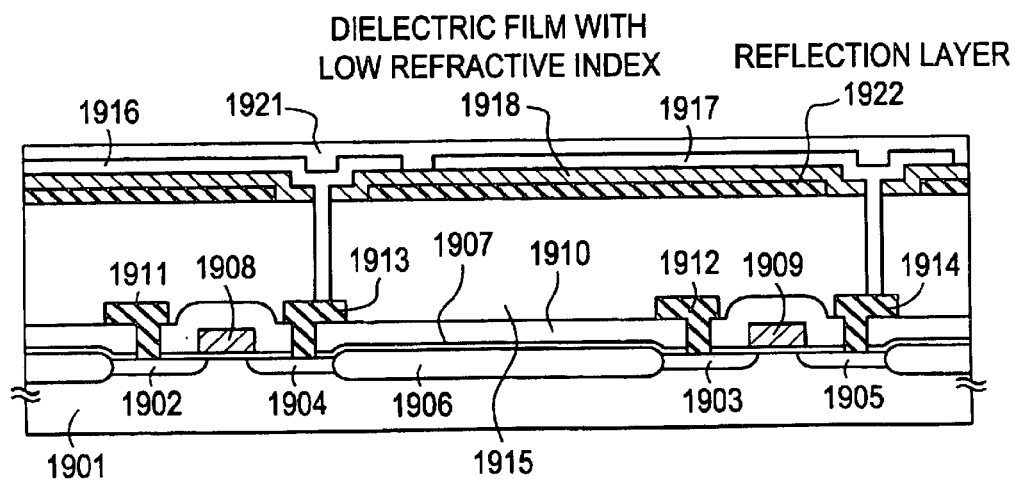
FIG. 17 is a sectional view showing an example of the structure according to Embodiment 11 of the present invention.

In FIG. 16, reference numeral 1801 denotes a glass substrate; 1802 and 1803, gate electrodes; 1804, a gate insulating film; 1805 and 1806, active layers. Each of the active layers 1805 and 1806 consists of a silicon film in which impurities are intentionally not added.

Reference numerals 1807 and 1808 denote source electrodes; 1809 and 1810, drain electrodes; 1811 and 1812, silicon nitride films to be channel stoppers (or etching stoppers). That is, of the active layers 1805 and 1806, regions situated below the channel stoppers 1811 and 1812 function substantially as channel-formation regions.

The above description is directed to the basic structure of the reversed stagger type TFT.

In the present embodiment, that sort of reversed stagger type TFT is covered with an interlayer insulating film 1813 consisting of an organic resin film so as to be flatten, a reflection layer 1822 and a dielectric film 1817 with a low refractive index of the present invention are formed on the interlayer insulating film, and pixel electrodes 1814 and 1815 comprising transparent conductive film are formed thereon to form an orientated layer 1819.

Next, an example will be described in which an insulating gate type field effect transistor (IGFET) is formed as a semiconductor device of the present invention. Incidentally, IGFET is called also as MOSFET, and designates a transistor formed on a silicon wafer.

In FIG. 10, reference numeral 1901 denotes a glass substrate; 1902 and 1903, source regions; 1904 and 1905, drain regions. A source/drain region is formed by adding impurities through ion implantation and diffusing the impurities thermally. Reference numeral 1906 denotes an oxide for separating a device, which can be formed using an ordinal technique of LOCOS.

A gate insulating film is denoted by reference numeral 1907; gate electrodes by 1908 and 1909; a first interlayer insulating film by 1910; source electrodes by 1911 and 1912; drain electrodes by 1913 and 1914. The top thereof is flattened by a second interlayer insulating film 1915 to form on the flattened surface a reflection layer 1912 and a dielectric film 1918 with a low refractive index of the present invention and to form pixel electrodes 1916 and 1917. Then an orientated layer 1921 is formed.

It is to be noted that the present invention may be applied also to an active matrix display that uses a thin film diode, MIM device, varistor device, etc. other than IGFET, top gate type or bottom gate type TFT shown in the present embodiment.

As described in the present embodiment hereinabove, the present invention is applicable to a reflection type LCD using a semiconductor device having any structure.

Embodiment 12

An example is described in which an AMLCD is formed by using a first substrate (an element formation-side substrate) that includes the structures shown in Embodiments 1 to 11. Here, FIG. 18 shows an appearance of the AMLCD of the present embodiment.

Figure 18A:
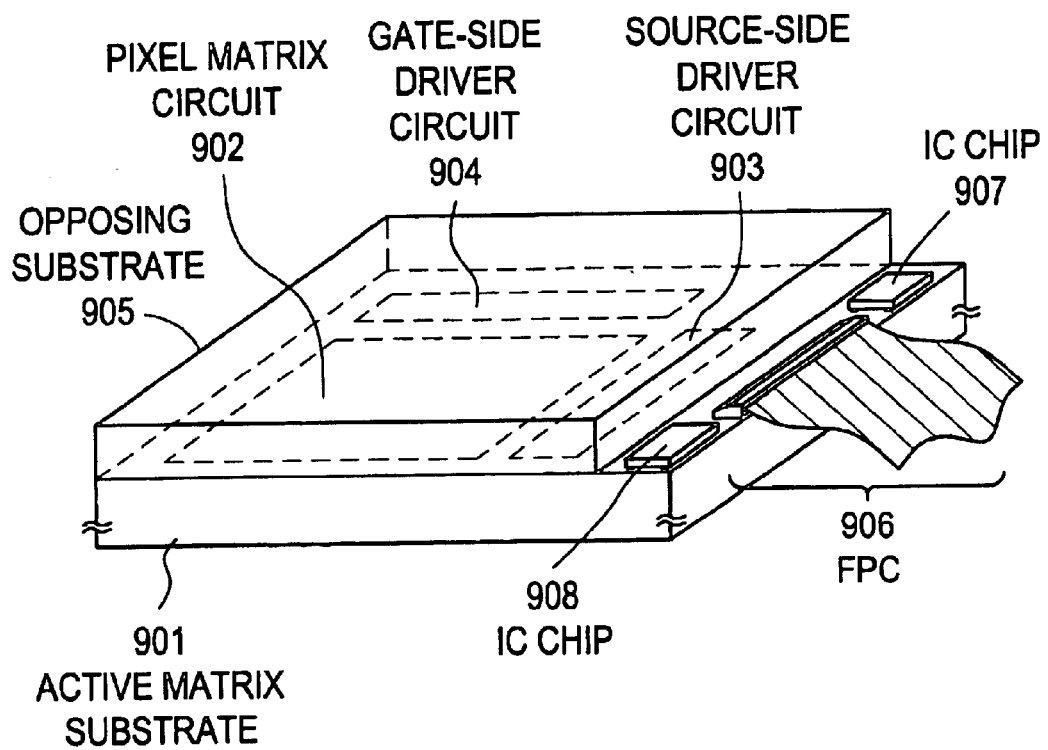
FIGS. 18A and 18B are perspective views showing an appearance of an AMLCD according to Embodiment 12 of the present invention.

In FIG. 18A, reference numeral 901 denotes an active matrix substrate, and a pixel matrix circuit 902, a source-side driver circuit 903, and a gate-side driver circuit 904 are formed thereon. It is preferable that the driver circuit is made up of a CMOS circuit in which an N-type TFT and a P-type TFT are complementarily combined. Further, reference numeral 905 denotes a counter substrate.

The AMLCD shown in FIG. 18A is formed by bonding an active matrix substrate 901 and the opposing substrate 905 while their end faces are aligned. However, a certain portion of the opposing substrate 905 is removed to expose the active matrix substrate, and an FPC (flexible print circuit) 906 is connected to the exposed active matrix substrate. This FPC 906 transmits an external signal to the inside of the circuit.

Further, an IC chips 907 and 908 are attached by using the surface on which the FPS 906 is mounted. These IC chips are constructed by various circuits such as a processing circuit of a video signal, a timing pulse generating circuit, a γ correction circuit, a memory circuit, and an arithmetic circuit which are formed on a silicon substrate. In FIG. 18A, an example is described in which two IC chips are formed. However, the number of the IC chips may be one, or a plurality of IC chips may be formed thereon.

Figure 18B:
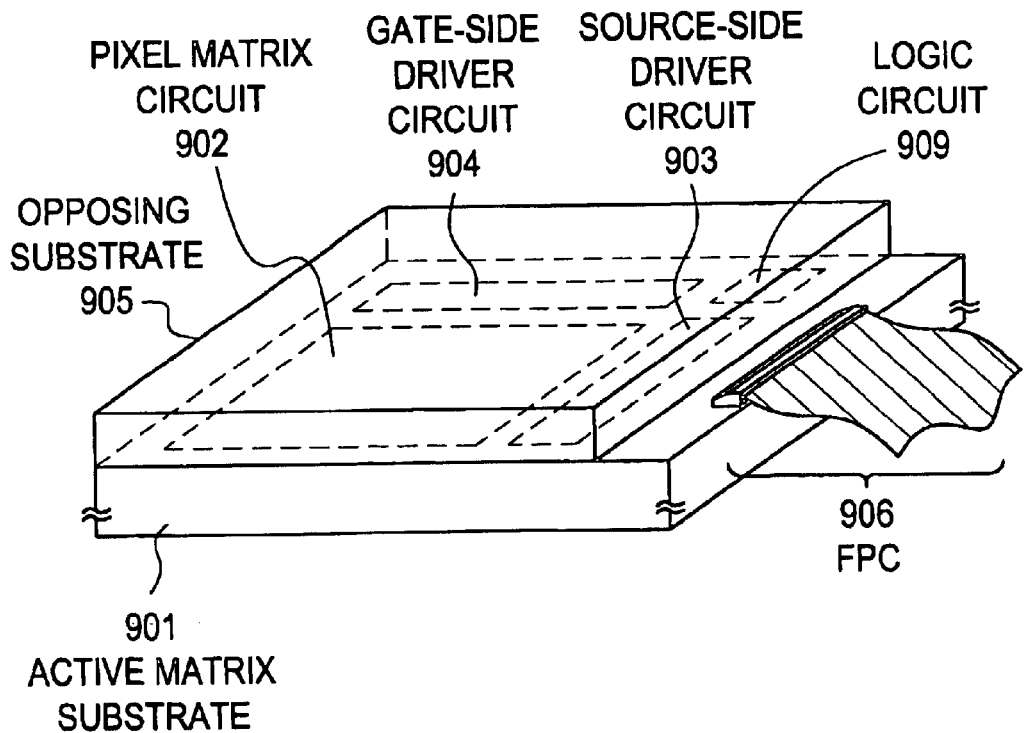

Further, the structure shown in FIG. 18B may be employed. In FIG. 18B, same reference numerals are given to the identical components. In FIG. 18n, an example is given in which a logic circuit 909 formed by a TFT on the same substrate performs a signal processing that has been performed by the IC chip in FIG. 18A. In this case, the logic circuit 909 is basically made up of the CMOS circuit as well as the driver circuits 903 and 904.

Further, display of color may be performed by using the color filter, or the liquid crystal may be driven by an ECB (electric field control birefringence) mode, a GH (guest host) mode, etc. without using the color filter.

Embodiment 13

The structure of the present invention may be applied to other various electro-optical devices and semiconductor circuits other than the AMLCD. Examples of the electro-optical devices other than the above-mentioned AMLCD include a liquid crystal display device of a simple matrix type driver system, an EL (electro luminescence) display device, an image sensor, a DMD (digital micromirror device), and the like. In case of applying the present invention to the DMD, it is possible to apply to a small mirror that responds to an electric signal.

In the present embodiment, an example is given below in which the present invention is applied to the liquid crystal display device of a simple matrix type driver system.

Incidentally, a general simple matrix type liquid crystal display device takes such a structure that a substrate having a stripped electrode in an X-direction and a substrate having a stripped electrode in a Y-direction sandwich the liquid crystal layer. Further, in the simple matrix, a voltage is directly applied to the liquid crystal by opposed X-Y electrode.

In the present embodiment, an example is shown in which the present invention is applied to an STN reflection type liquid crystal panel. A light reflection layer formed of a dielectric multilayer film, a first transparent electrode that is a stripped electrode in the X-direction, and an orientated layer are, formed on a glass substrate (first substrate). Although the light reflection layer consisting of the dielectric multilayer film is formed downward of the transparent electrode in the present embodiment, it is not particularly limited. A second transparent electrode that is a stripped electrode in the Y-direction and the orientated layer are formed on the other glass substrate (second substrate). The two glass substrates are opposed to each other while a surface on which the orientated layer of the glass substrate is formed, is made inside. The interval of the glass substrates is secured by a cell gap holding member, and an STN liquid crystal is sealed in the gap of these substrates.

The method of forming the reflection type liquid crystal panel of the present embodiment is described hereinbelow. First, the light reflection layer consisting of the dielectric multilayer film is formed on the first glass substrate.

As the material used for the above-mentioned reflection layer, $SiO_2$, $MgF_2$, $Na_3AlF_6$, or the like are enumerated as the dielectric film with a low refractive index. It should be noted that for other low refractive index dielectric material, an orientated layer, acrylic, or polyimide (refractive index of 1.5 to 1.6) may also be used. Further, $TiO_2$, $ZrO_2$, $Ta_2O_5$, ZnS, ZnSe, ZnTe, Si, Ge, $Y_2O_3$, and $Al_2O_3$, etc., may be used as the dielectric film with a high refractive index. Further, a transparent conductive film such as ITO (refractive index of 1.98) may be used as the other material having a high refractive index.

In the present embodiment, as the dielectric film with a low refractive index, $SiO_2$ (refractive index of 1.43) is used, and as the dielectric film with a high refractive index, $TiO_2$ (refractive index of 2.2) is used.

The film thickness of the dielectric multilayer film is adjusted to form the $\lambda/4$ film in a visible light region (400 nm<$\lambda$ <700 nm). The range of the film thickness of the dielectric film with a low refractive index ($SiO_2$) to form the $\lambda/4$ film in the above-mentioned visible light region is within a range from 70 nm to 122 nm. Further, the range of the film thickness of the dielectric film with a high refractive index ($TiO_2$) to form the $\lambda/4$ film in the above-mentioned visible light region is within a range from 45.5 nm to 79.5 nm. If the film thickness is adjusted to the above-mentioned range, rays of required reflected wavelength band enhance with one another by an interference effect, thereby being capable of effectively reflecting the rays. In the present embodiment, the dielectric multilayer film is formed of, considering two layers of the dielectric film with a low refractive index having a film thickness of 70 nm and the dielectric film with a high refractive index having a film thickness of 50 nm to be one set with each other, four sets, that is, a total of eight layers (960 nm).

Next, a first transparent electrode is formed. In the present embodiment, an ITO film is formed in a film thickness of 100 nm, and patterned to form a stripped transparent electrode. The transparent electrode extends perpendicular to a paper surface.

Next, an orientated layer is formed. For a material of the orientated layer, a vertical orientated layer of polyimide type is used. This polyimide-type vertical orientated layer is formed on the first substrate by spin coat method, flexographic printing method, or screen printing method.

Then, a processing to another glass substrate (second substrate) is described. The color filter is formed on the second substrate, and the color filter forms a protective film formed of an acrylic resin and an epoxy resin. In the present embodiment, the protective film is formed of an acrylic resin having a thickness of 1 $\mu$m.

Next, a second transparent electrode formed of a transparent conductive film such as ITO (indium tin oxide) and $SnO_2$ (tin oxide) is formed. In the present embodiment, an ITO film is formed by sputtering and is patterned to form the stripped second transparent electrode. Then, an orientated layer formed of a polyimide-type vertical orientated layer is formed.

Subsequently, a rubbing process is performed to the orientated layers formed on the first substrate and the second substrate, respectively. The rubbing direction is one diagonal direction of the substrate, and the rubbing direction of the orientated layer is orthogonal in such a state that the first substrate is opposed to the second substrate.

Then, a cell gap material is formed on one of one set of substrates, and a sealant to bond the substrates together is applied thereto. In the present embodiment, at a marginal part of the second substrate side, sealant consisting of an ultraviolet ray curing-type resin is applied while remaining liquid crystal injection inlet. Then, the first substrate and the second substrate are opposed to each other, the cell gap presses at a certain level, and the ultraviolet ray is irradiated thereto in this state to cure the sealing member.

Next, the liquid crystal is injected from the liquid crystal injection inlet. Thereafter, the sealant is applied to the liquid crystal injection inlet, and the sealant is cured by irradiating the ultraviolet ray thereto to completely seal the liquid crystal in the cell. Then, a phase different plate, a polarizer, and a forward scattering plate are formed at the back surface of the second substrate, respectively. Through the aforementioned processes, the manufacture of a full color STN liquid crystal panel is completed.

Incidentally, it is needless to say that so long as the simple matrix-type drive system liquid crystal display device has a reflection layer consisting of at least a dielectric multilayer film and a transparent electrode, the structure and the manufacturing process of the present embodiment are not limited.

Embodiment 14

The AMLCDs shown in Embodiments 1 to 12 are utilized as the display in various electronic devices. The electric devices referred in the present embodiment are defined as products each mounting a liquid crystal display device of active matrix type.

As the electric devices, a video camera, a still camera, a projector, a projection TV, a head-mount display, a navigation system for vehicle, a personal computer (including a notebook computer) and a portable information terminal (a mobile computer, a cellular phone) may be enumerated. Examples of those are shown in FIGS. 19A to 19F.

Figure 19A:
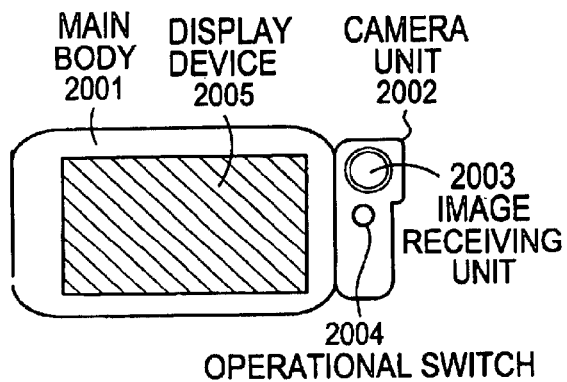
FIGS. 19A to 19F show examples of products to which the present invention is applied.

FIG. 19A shows a mobile computer consisting of a main body 2001, a camera unit 2002, an image receiving unit 2003, an operational switch 2004 and a display device 2005. The present invention is applicable to the image receiving unit 2003, display device 2005, and the like.

Figure 19B:
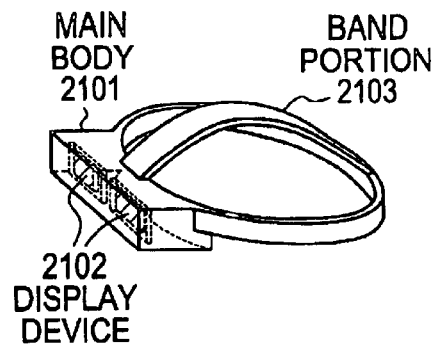

FIG. 19B shows a head-mount display consisting of a main body 2101, a display device 2102 and a band portion 2103. The present invention is applicable to the display device 2102.

Figure 19C:
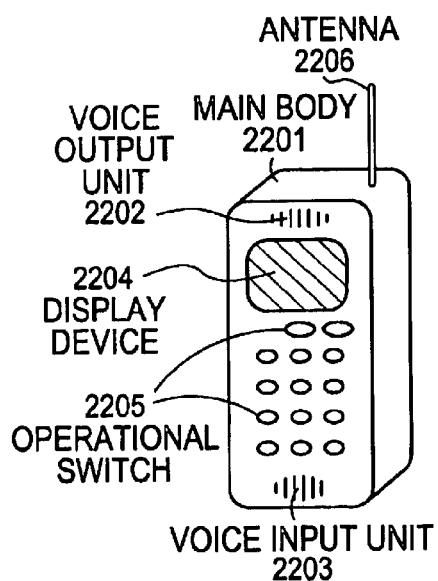

FIG. 19C shows a cellular phone consisting of a main body 2201, a voice output unit 2202, a voice input unit 2203, a display device 2204, an operational switch 2205 and an antenna 2206. The present invention is applicable to the voice output unit 2202, voice input unit 2203, display device 2204 and the like.

Figure 19D:
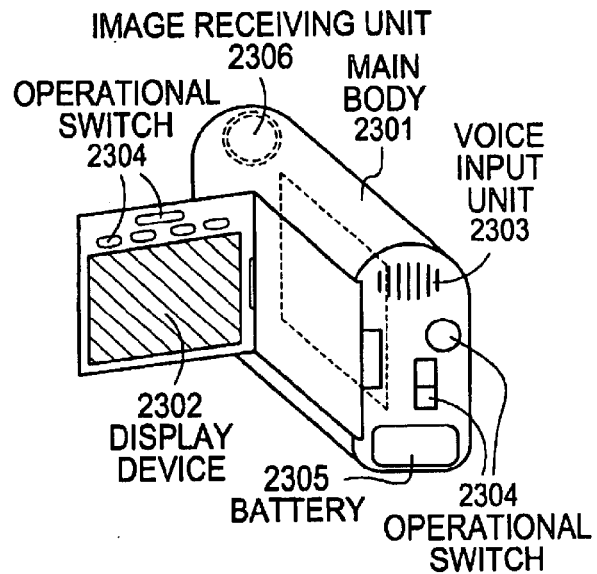

FIG. 19D shows a video camera consisting of a main body 2301, a display device 2302, a voice input unit 2303, an operational switch 2304, a battery 2305, and an image receiving unit 2306. The present invention is applicable to the display device 2302, the voice input unit 2303 and the image receiving unit 2306.

Figure 19E:
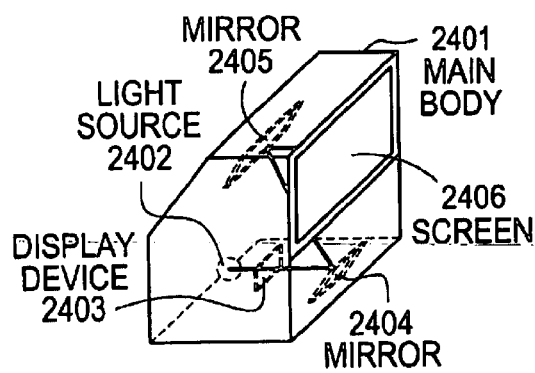

FIG. 19E shows a rear projector consisting of a main body 2401, a light source 2402, a display device 2403, mirrors (such as a polarized light beam splitter) 2404, 2405 and a screen 2406. The present invention is applicable to the display device 2403.

Figure 19F:
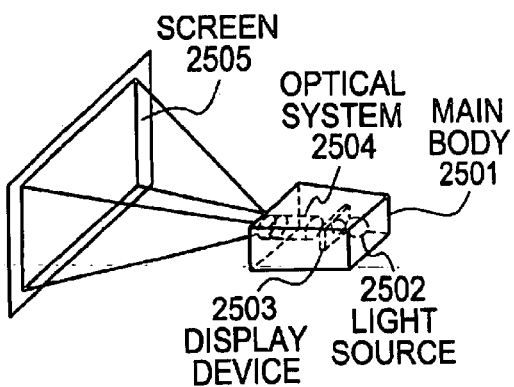

FIG. 19F shows a front projector consisting of a main body 2501, a light source 2502, a display device 2503, an optical system 2504 and a screen 2505. The present invention is applicable to the display device 2503.

Embodiment 15

CMOS circuits and pixel active matrix circuits produced by the embodiments of the present invention can be applied to a plurality of electro-optical devices (e.g. an active matrix type liquid crystal display, an active matrix type EL display, and an active matrix type EC display). That is, the present invention can be carried out for all the electric apparatus including such the electro-optical devices as display media.

As such electronic apparatus, a video camera, a digital camera, a projector (rear type or front type), a head mount display (a goggle type display), a car navigation system, a personal computer, a portable information terminal (mobile computer, portable telephone, electric book, etc.) and the like are enumerated. Examples of those are shown in FIG. 22A to FIG. 22F, FIG. 23A to FIG. 23D, and FIG. 24A to FIG. 24C.

Figure 22A:
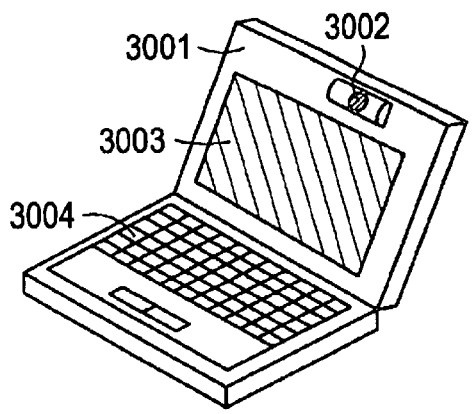
FIGS. 22A to 22F show examples of products to which the present invention is applied.

FIG. 22A shows a personal computer which is constituted by a main body 3001, an image input portion 3002, a display device 3003, and a keyboard 3004. The present invention can be applied to the image input portion 3002, the display device 3003, and other signal control circuits.

Figure 22B:
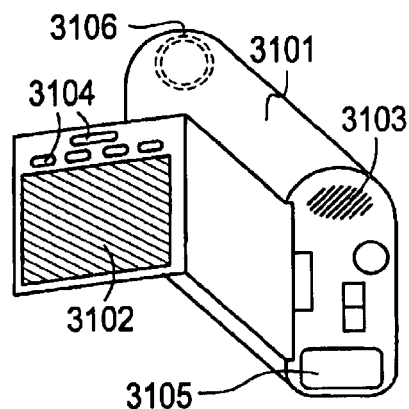

FIG. 22B shows a video camera which is constituted by a main body 3101, a display device 3102, an audio input portion 3103, an operation switch 3104, a battery 3105, and an image receiving portion 3106. The present invention can be applied to the display device 3102, the audio input portion 3103, and other signal control circuits.

Figure 22C:
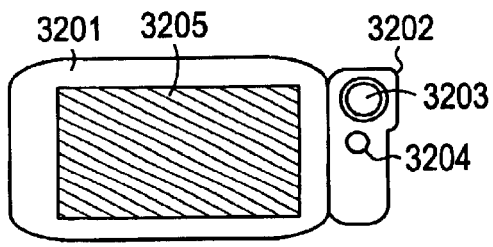

FIG. 22C shows a mobile computer which is constituted by a main body 3201, a camera portion 3202, an image receiving portion 3203, an operation switch 3204, and a display device 3205. The present invention can be applied to the display device 3205 and other signal control circuits.

Figure 22D:
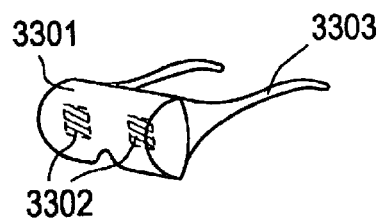

FIG. 22D shows a goggle type display which is constituted by a main body 3301, a display device 3302, and an arm portion 3303. The present invention can be applied to the display device 3302 and other signal control circuits.

Figure 22E:
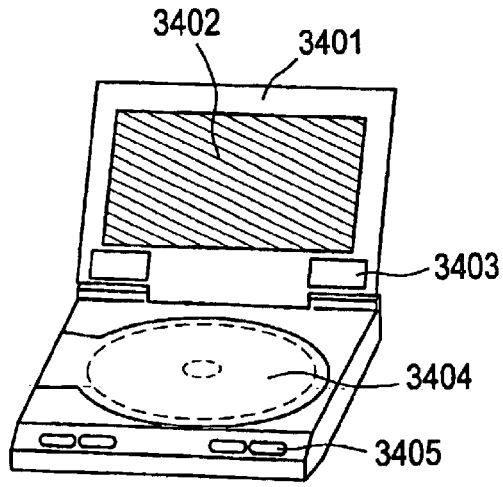

FIG. 22E shows a player apparatus which is equipped with a recording medium for recording a program (hereinafter, called "a recording medium"). The player apparatus is constituted by a main body 3401, a display device 3402, a speaker portion 3403, a recording medium 3404, and an operation switch 3405. This apparatus by includes a DVD (digital Versatile Disc), a CD and the like as the recording medium for appreciating music and movie, playing a game, and Internet. The present invention can be applied to the display device 3402 and other signal control circuits.

Figure 22F:
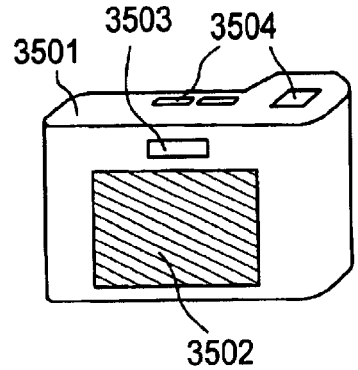

FIG. 22F shows a digital camera which is constituted by a main boy 3501, a display device 3502, an eyepiece portion 3503, an operation switch 3504 and an image receiving portion (not shown). The present invention can be applied to the display device 3502 and other signal control circuits.

Figure 23A:
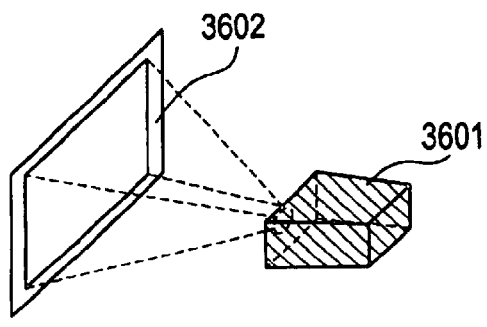
FIG. 23A shows a front type projector according to the present invention.

FIG. 23A shows a front type projector which is constituted by a light source optical system and a display device 3601, and a screen 3602. The present invention can be applied to the display device and other signal control circuits.

Figure 23B:
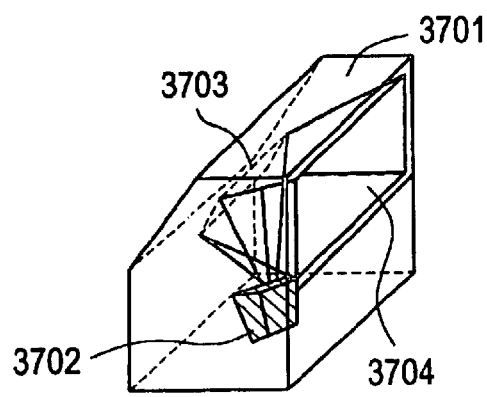
FIG. 23B shows a rear type projector according to the present invention.

FIG. 23B shows a rear type projector which is constituted by a main body 3701, a light source optical system and a display device 3702, a mirror 3703 and a screen 3704. The present invention can be applied to the display device and other signal control circuits.

Figure 23C:
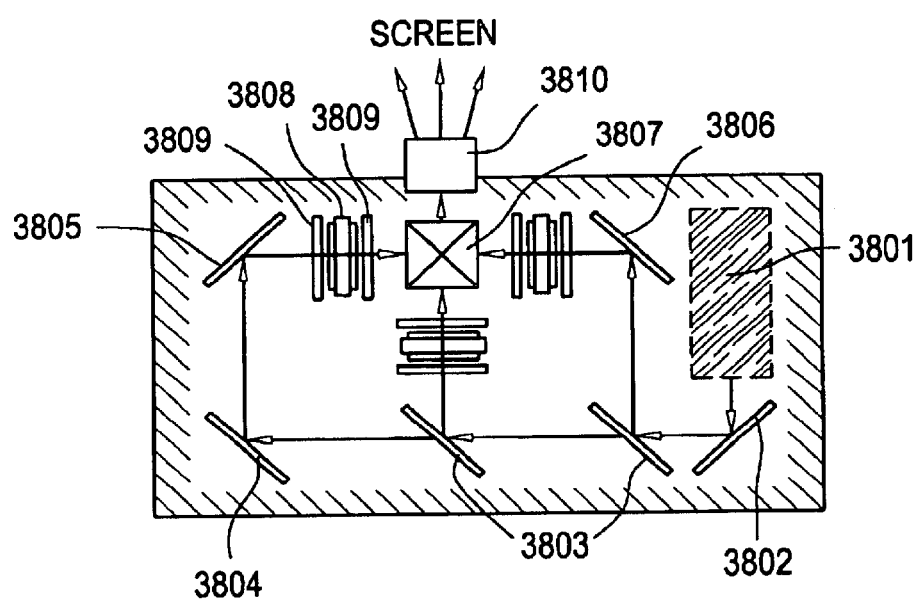
FIG. 23C shows an example structure of a light source optical system and a display device in FIG. 23A or in FIG. 23B.

FIG. 23C shows an example structure of a light source optical system and a display device 3601 in FIG. 23A, or 3702 in FIG. 23B. Each of numerals 3601 and 3702 includes a light source optical system 3801, mirrors 3802, 3804–3806, a dichroic mirror 3803, another optical system 3807, a display device 3808, a phase difference plate 3809, and a projection optical system 3810. The projection optical system 3810 is constituted by a plurality of optical lenses equipped with a projection lens. Such a projection system as shown in FIG. 23C is called a three-plate type since this structure includes three plates of display devices. Further, it is proper for a researcher to form, in an optical path indicated by an arrow in FIG. 23C, an optical lens, a film with a polarizing characteristics, a film to control a phase difference, an IR film, etc.

Figure 23D:
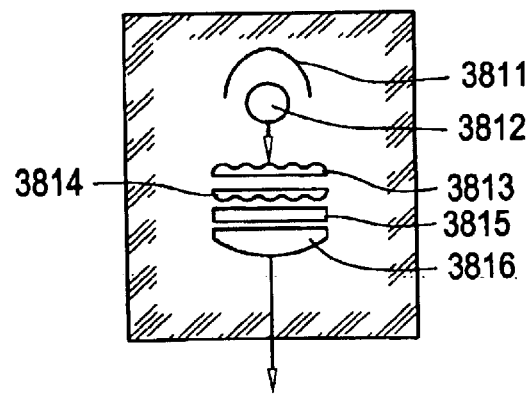
FIG. 23D shows an example structure of a light source optical system in FIG. 23C.

FIG. 23D shows an example structure of a light source optical system 3801 in FIG. 23C. In this embodiment, the light source optical system 3801 includes a reflector 3811, a light source 3812, lens arrays 3813 and 3814, a polarizing conversion element 3815 and a condenser lens 3816. However, the present invention is not specifically limited by this embodiment because it is just an example. For example, in an optical path, an optical lens, a film with a polarizing characteristics, a film to control a phase difference, an IR film, etc. can be properly formed.

Figure 24A:
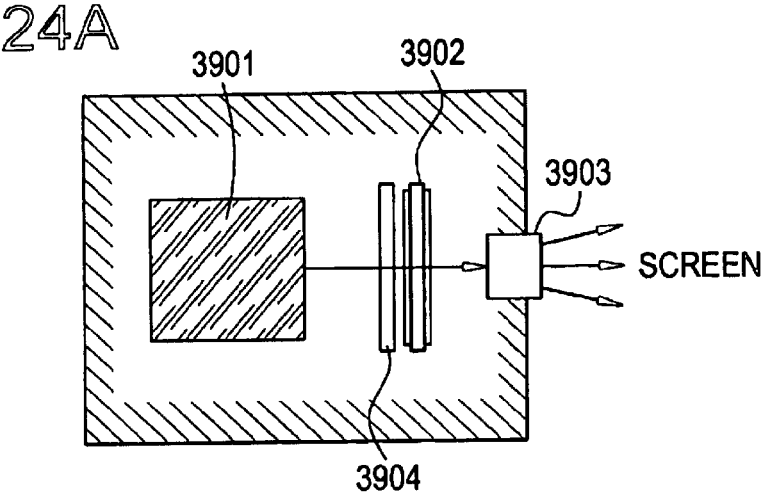
FIG. 24A shows a light source optical system and display device.

While FIG. 23C shows an example of the three-plate type, FIG. 24A shows an example of single-plate type. A light source optical system 3901, a display device 3902, a projection optical system 3903 are included in a light source optical system and a display device shown in FIG. 24A. It is possible to apply the light source optical system and display device shown in FIG. 24A to the light source optical system and display device 3601 shown in FIG. 23A, or 3702 in FIG. 23B. Further, the light source optical system 3901 can be applied by the light source optical system shown in FIG. 23D. In addition, the display device 3902 is equipped with a color filter (not shown), so that display image is colored.

Figure 24B:
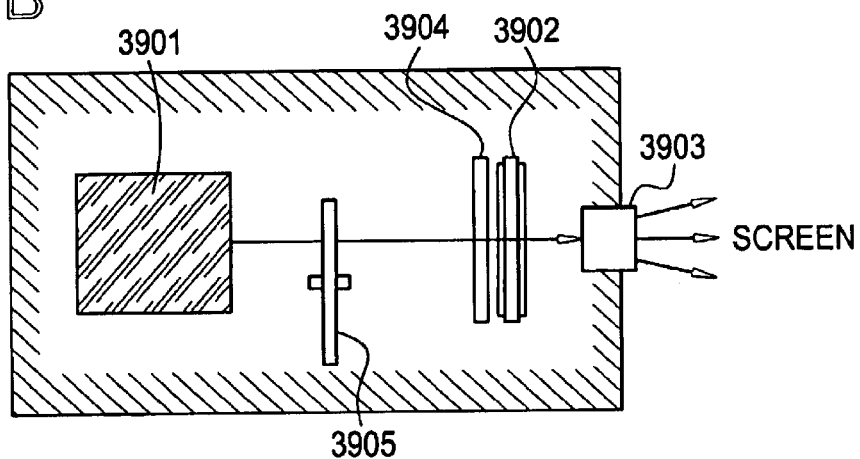
FIG. 24B shows a light source optical system and display device.

FIG. 24B shows an applied example of a light source optical system and a display device which is applied by FIG. 24A. Instead of forming a color filter, a display image is colored by RGB rotary color filter disc 3905. It is possible to apply the light source optical system and display device shown in FIG. 24B to the light source optical system and display device 3601 shown in FIG. 23A, or 3702 in FIG. 23B.

Figure 24C:
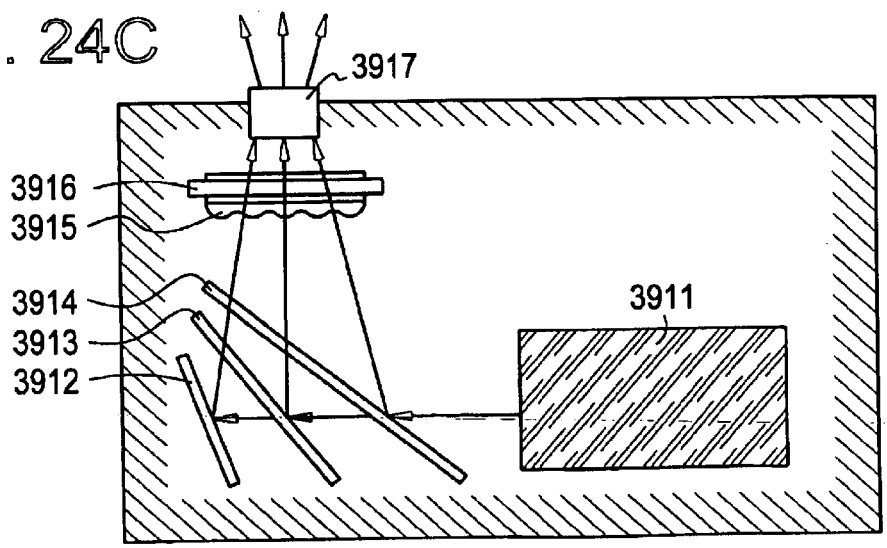
FIG. 24C shows a structure of a light source optical system and display device.

A structure of the light source optical system and display device, as shown in FIG. 24C is called as a color-filterless single-plate type. In this structure, a display device 3916 is equipped with a microlens array 3915, and a display image is colored by a dichroic mirror (Green) 3912, a dichroic mirror (Red) 3913 and a dichroic mirror (Blue). A projection optical system 3917 is constituted by a plurality of lenses including a projection lens. It is possible to apply the light source optical system and display device shown in FIG. 24C to the light source optical system and display device 3601 shown in FIG. 23A, or 3702 in FIG. 23B. Further, as the light source optical system 3911, an optical system having a coupling lens and a collimating lens other than a light source can be applied.

As described above, the present invention can be applied in a large range, so that it is possible to apply to any electric apparatus in every field. In addition, the electric apparatus in the instant invention can be realized by using any structure combined with Embodiments.

As described above, the present invention has wide application range so that it is applicable to electric devices of any field. In addition, the present invention may be utilized for an electric board, a display for advertizing or publicity, etc.

In the present invention, the reflectivity of 90% or more is readily attained by using a dielectric multi-layer film as a reflection layer, and by appropriately changing materials, film thickness, number of laminated layer or the like. The invention may therefore be applied as an liquid crystal display panel to wide range of electric devices. Employment of the arrangement according to the present invention makes it possible to obtain the reflectivity equal to or more than 90% and less than 100%, even when the orientated layers are laminated.

In particular, a reflection type liquid crystal LCD of the present invention may realize high opening rate with the arrangement in which the dielectric multi-layer film is used as the reflection layer to form thereon the pixel electrode consisting of a transparent conductive film.

Also, the pixel electrode consisting of a transparent conductive film and the common electrode consisting of a transparent conductive film can easily form the auxiliary capacitance with the dielectric multi-layer film that is the reflection layer being a dielectric.

In the arrangement using as the reflection layer a material film that has reflectivity and is not connected to the pixel electrode and the switching element, pattern of the reflection layer is not necessarily be the conventional matrix-like pattern involving gaps (shown in FIG. 14). The leak of light can be therefore decreased and a large reflection area may also be obtained.

The dielectric film (dielectric multi-layer film) and the pixel electrode of the above arrangement can protect the reflection layer.

Also, without increasing the number of processes as compared with the conventional device, it is possible to obtain an increased reflection effect owing to the dielectric film and to readily form the auxiliary capacitance using the pixel electrode consisting of a transparent conductive film and the reflection layer with the dielectric multi-layer film being a dielectric.

The present invention can provide a novel liquid crystal panel with which display is bright and is clearly observed.

What is claimed is:

1. A liquid crystal display device comprising a switching element formed on a substrate, a pixel electrode connected to said switching element, and a reflection layer, wherein said switching element is connected to a capacitance, wherein said capacitance comprises a common electrode formed of a transparent conductive film, a dielectric film formed on said common electrode, and said pixel electrode formed of a transparent conductive film formed on said dielectric film, wherein said reflection layer comprising a dielectric multi-layer film is provided below said common electrode, and wherein said pixel has a thickness of 50.5 nm to 88.4 nm, and said thickness is satisfied by the equation $nd=\lambda/4$, where n is a refractive index, d is a film thickness, and $\lambda$ is a center wavelength.

2. A device according to claim 1, wherein said dielectric film comprises a dielectric material having a low refractive index, and wherein said common electrode and said pixel electrode both comprise a conductive material having a high refractive index.

3. A device according to claim 1, wherein a liquid crystal is sealed between a pair of substrates, said liquid crystal display device comprises said pixel electrode arranged in a matrix manner over one of said pair of substrates, a thin film transistor connected to said pixel electrode, and a reflection layer.

4. A method of manufacturing a liquid crystal display device, comprising the steps of:
forming a switching element on a substrate;
forming an interlayer insulating film over said switching element;
forming a common electrode formed of a transparent conductive film Over Said interlayer insulating film;
forming a dielectric multi-layer film on said common elect rode; and
forming a pixel electrode formed of a transparent conductive film on said dielectric multi-layer film to form an auxiliary capacitance comprised of said pixel electrode, said dielectric multi-layer film, and said common electrode.

5. A method according to claim 4, wherein said step of forming said dielectric multilayer film is performed by sputtering method or vacuum deposit method.

6. A liquid crystal display device comprising:
a switching element formed over a substrate;
a reflection layer formed over the switching element, said reflection layer comprising at least first, second, third and fourth laminated dielectric layers wherein each of the first and third dielectric layers comprises a material selected from the group consisting Of $SiO_2$, $MGF_2$, $NA_3AlF_6$, acrylic and polyimide, and each of the second and fourth dielectric layers comprises a material selected from the group consisting of $TiO_2$, $ZrO_2$, $Ta_2O_5$, ZnS, ZnSe, ZnTe, Si, Ge and $Y_2O_3$; and
a pixel electrode comprising a transparent conductive film on the reflection layer, wherein a thickness of said pixel electrode is within a range of 55.5 to 88.4 nm.

7. A device according to claim 6, wherein said switching element is selected from the group consisting of a thin film transistor, a thin film diode, MIM device and varistor device.

8. A liquid crystal display device comprising:
a switching element formed over a substrate;
a reflection layer formed over the switching element, said reflection layer comprising at least first, second, third and fourth laminated dielectric layers wherein each of the first and third dielectric layers comprises a material selected from the group consisting of $SiO_2$, $MGF_2$, $NA_3AlF_6$, acrylic and polyimide, and each of the second and fourth dielectric layers comprises a material selected from the group consisting of $TiO_2$, $ZrO_2$, $Ta_2O_5$, ZnS, ZnSe, ZnTe, Si, Ge and $Y_2O_3$,
wherein a thickness of said first and third dielectric layers is within a range of 70 nm to 122 nm and said second and fourth dielectric layers is within a range of 45.5 nm to 79.5 nm; and
a pixel electrode comprising a transparent conductive film on the reflection layer.

9. A device according to claim 8, wherein said first, second, third and fourth laminated dielectric layers are laminated in this order from a side of said substrate.

10. A device according to claim 8, wherein a thickness of said pixel electrode is within a range of 55.5 to 88.4 nm.

11. A device according to claim 8, wherein said switching element is selected from the group consisting of a thin film transistor, thin film diode, MIM device and varistor device.

12. A liquid crystal display device comprising:
a switching element formed over a substrate;
an interlayer insulating film over the switching element;
a reflection metal film formed over the interlayer insulating film;
a reflection layer formed comprising a dielectric multilayer film formed over the reflection metal film; and
a pixel electrode comprising a transparent conductive film formed over the reflection dielectric layer wherein said reflection dielectric layer is interposed between said pixel electrode and said reflection metal film.

13. A device according to claim 12, wherein said reflection layer comprises at least first, second, third and fourth laminated dielectric layers wherein each of the first and third dielectric layers comprises a material selected from the group consisting of $SiO_2$, $MGF_2$, $NA_3AlF_6$, acrylic and polyimide, and each of the second and fourth dielectric layers comprises a material selected from the group consisting of $TiO_2$, $ZrO_2$, $Ta_2O_5$, ZnS, ZnSe, ZnTe, Si, Ge and $Y_2O_3$.

14. A device according to claim 12, wherein a thickness of said pixel electrode is within a range of 55.5 to 88.4 nm.

15. A device according to claim 12, wherein a thickness of said first and third dielectric layers is within a range of 70 nm to 122 nm and said second and fourth dielectric layers is within a range of 45.5 nm to 79.5 nm.

16. A device according to claim 12, wherein said reflection metal film comprises aluminum, silver, rhodium, nickel and an alloy containing those as the main component.

17. A device according to claim 12, wherein said switching element is selected from the group consisting of a thin film transistor, thin film diode, MIM device and varistor device.

18. A liquid crystal display device comprising:
a semiconductor substrate;
an interlayer insulating film over the semiconductor substrate;
a reflection dielectric layer comprising a dielectric multilayer film over the interlayer insulating film,
wherein said reflection dielectric layer comprises at least first, second, third and fourth laminated dielectric layers wherein each of the first and third dielectric layers comprises a material selected from the group consisting of $SiO_2$, $MGF_2$, $NA_3AlF_6$, acrylic and polyimide, and each of the second and fourth dielectric layers comprises a material selected from the group consisting of $TiO_2$, $ZrO_2$, $Ta_2O_5$, ZnS, ZnSe, ZnTe, Si, Ge and $Y_2O_3$; and
a pixel electrode comprising a transparent conductive film on the reflection layer, wherein a thickness of said pixel electrode is within a range of 55.5 to 88.4 nm.

19. A liquid crystal display device comprising:
a semiconductor substrate;
an interlayer insulating film over the semiconductor substrate;
a reflection dielectric layer comprising a dielectric multilayer film over the interlayer insulating film,
wherein said reflection dielectric layer comprises at least first, second, third and fourth laminated dielectric layers wherein each of the first and third dielectric layers comprises a material selected from the group consisting of $SiO_2$, $MGF_2$, $NA_3AlF_6$, acrylic and polyimide, and each of the second and fourth dielectric layers comprises a material selected from the group consisting of TiO$_2$, ZrO$_2$, Ta$_2$O$_5$, ZnS, ZnSe, ZnTe, Si, Ge and Y$_2$O$_3$, wherein a thickness of said first and third dielectric layers is within a range of 70 nm to 122 nm and said second and fourth dielectric layers is within a range of 45.5 nm to 79.5 nm; and a pixel electrode comprising a transparent conductive film on the reflection layer.

20. A device according to claim 19, wherein said first, second, third and fourth laminated dielectric layers are laminated in this order from a side of said substrate.

21. A device according to claim 19, wherein a thickness of said pixel electrode is within a range of 55.5 to 88.4 nm.

22. A liquid crystal display device comprising:

a semiconductor substrate;

an interlayer insulating film over the semiconductor substrate;

a reflection metal film formed over the interlayer insulating film;

a reflection layer formed comprising a dielectric multilayer film formed over the reflection metal film, wherein said reflection layer comprises at least first, second, third and fourth laminated dielectric layers wherein each of the first and third dielectric layers comprises a material selected from the group consisting of SiO$_2$, MGF$_2$, NA$_3$AlF$_6$, acrylic and polyimide, and each of the second and fourth dielectric layers comprises a material selected from the group consisting of TiO$_2$, ZrO$_2$, Ta$_2$O$_5$, ZnS, ZnSe, ZnTe, Si, Ge and Y$_2$O$_3$; and a pixel electrode comprising a transparent conductive film formed over the reflection dielectric layer wherein said reflection dielectric layer is interposed between said pixel electrode and said reflection metal film.

23. A device according to claim 22, wherein a thickness of said pixel electrode is within a range of 55.5 to 88.4 nm.

24. A device according to claim 22, wherein a thickness of said first and third dielectric layers is within a range of 70 nm to 122 nm and said second and fourth dielectric layers is within a range of 45.5 nm to 79.5 nm.

25. A device according to claim 22, wherein said reflective metal film comprises aluminum, silver, rhodium, nickel and an alloy containing those as the main component.

26. A device according to claim 22, wherein said reflection metal film is electrically floating.

* * * * *

UNITED STATES PATENT AND TRADEMARK OFFICE
CERTIFICATE OF CORRECTION

PATENT NO.    : 6,839,108 B1
DATED         : January 4, 2005
INVENTOR(S)   : Yoshiharu Hirakata et al.

It is certified that error appears in the above-identified patent and that said Letters Patent is hereby corrected as shown below:

Column 32,
Line 61, after "pixel" insert -- electrode --.

Signed and Sealed this

Third Day of May, 2005

JON W. DUDAS
*Director of the United States Patent and Trademark Office*